United States Patent
Horiuchi et al.

(10) Patent No.: US 10,785,767 B2
(45) Date of Patent: *Sep. 22, 2020

(54) TRANSMITTING DEVICE, RECEIVING DEVICE, TRANSMITTING METHOD, AND RECEIVING METHOD

(71) Applicant: Sun Patent Trust, New York, NY (US)

(72) Inventors: Ayako Horiuchi, Kanagawa (JP); Akihiko Nishio, Osaka (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/385,998

(22) Filed: Apr. 16, 2019

(65) Prior Publication Data

US 2019/0246383 A1 Aug. 8, 2019

Related U.S. Application Data

(63) Continuation of application No. 15/959,002, filed on Apr. 20, 2018, now Pat. No. 10,306,621, which is a (Continued)

(30) Foreign Application Priority Data

Jan. 19, 2012 (JP) ................ 2012-009267

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0023* (2013.01); *H04L 5/0048* (2013.01);
(Continued)

(58) Field of Classification Search
CPC .......... H04W 72/042; H04W 72/0406; H04W 72/1268; H04L 5/0048; H04L 5/0023; H04L 5/0053; H04L 1/0057
See application file for complete search history.

(56) References Cited

U.S. PATENT DOCUMENTS 8,537,862 B2 * 9/2013 Blankenship ......... H04L 5/0053
370/252
8,923,201 B2 12/2014 Papasakellariou et al.
(Continued)

FOREIGN PATENT DOCUMENTS

EP       2 584 725 A2    4/2013
WO   2011/159111 A2   12/2011

OTHER PUBLICATIONS

3GPP TS 36.216 V10.1.0, "3rd Generation Partnership Project; Technical Specification Group Radio Access Network; Evolved Universal Terrestrial Radio Access (E-UTRA); Physical layer for relaying operation (Release 10)," Dec. 2010, 15 pages.
(Continued)

*Primary Examiner* — Will W Lin
(74) *Attorney, Agent, or Firm* — Seed IP Law Group LLP

(57) ABSTRACT

In a transmitting device, each of the plurality of mapping candidates that make up the search space is configured from the same number of control channel elements as an aggregation level value, the control channel elements are obtained by dividing each physical resource block into a predetermined number, and the quantity of resource elements contained in each of the predetermined number of control channel elements in each physical resource block adopts at least two types of values. A search space setting unit sets a search space of which the aggregation level value is 2 or more so that, between a plurality of mapping candidates, variation in the total quantity of resource elements contained in the control channel elements that make up the mapping candidates is as small as possible.

7 Claims, 21 Drawing Sheets

Related U.S. Application Data continuation of application No. 15/599,300, filed on May 18, 2017, now Pat. No. 9,980,264, which is a continuation of application No. 15/278,962, filed on Sep. 28, 2016, now Pat. No. 9,686,785, which is a continuation of application No. 14/005,522, filed as application No. PCT/JP2013/000004 on Jan. 7, 2013, now Pat. No. 9,497,736.

(51) Int. Cl.
  *H04L 1/00* (2006.01)
  *H04W 72/12* (2009.01)
(52) U.S. Cl.
  CPC ....... *H04L 5/0053* (2013.01); *H04W 72/0406* (2013.01); *H04L 1/0057* (2013.01); *H04W 72/1268* (2013.01)

(56) References Cited

U.S. PATENT DOCUMENTS

| | | | |
|---|---|---|---|
| 8,989,022 B2 | 3/2015 | Yang et al. | |
| 9,516,636 B2* | 12/2016 | Park | H04W 72/14 |
| 9,893,860 B2* | 2/2018 | Pan | H04B 7/0667 |
| 2009/0088148 A1 | 4/2009 | Chung et al. | |
| 2011/0044391 A1 | 2/2011 | Ji et al. | |
| 2011/0076962 A1 | 3/2011 | Chen et al. | |
| 2011/0110316 A1 | 5/2011 | Chen et al. | |
| 2011/0170496 A1 | 7/2011 | Fong et al. | |
| 2013/0088973 A1 | 4/2013 | Yang et al. | |
| 2014/0056279 A1* | 2/2014 | Chen | H04W 52/04 370/330 |
| 2014/0119317 A1* | 5/2014 | Kim | H04L 5/0048 370/329 |
| 2014/0126487 A1 | 5/2014 | Chen et al. | |
| 2014/0133346 A1* | 5/2014 | Kang | H04W 24/10 370/252 |
| 2014/0293924 A1* | 10/2014 | Wang | H04L 5/0053 370/329 |
| 2014/0328302 A1 | 11/2014 | Park et al. | |

OTHER PUBLICATIONS

Extended European Search Report dated Jul. 8, 2015, for corresponding EP Application No. 13738307.1-1851 / 2797372, 9 pages.
International Search Report dated Feb. 12, 2013, for corresponding International Application No. PCT/JP2013/000004, 3 pages. (W/ English Translation).
Motorola Mobility, "E-PDCCH Design Aspects," R1-114029, 3GPP TSG RAN WG1 #67, Agenda Item: 7.7, Nov. 14-18, 2011, San Francisco, USA, 4 pages.
Panasonic, "Considerations on search space for enhanced PDCCH," R1-113816, 3GPP TSG RAN WG1 Meeting #67, Agenda Item: 7.7.3, Nov. 14-18, 2011, San Francisco, USA, 3 pages.
Panasonic Corporation, "Multiplexing of ePDCCH RE mapping," R1-120237, 3GPP TSG RAN WG1 Meeting #68, Agenda Item: 7.6.4, Dresden, Germany, Feb. 6-10, 2012, pp. 1-4.
Panasonic, "Definitions of eREG and eCCE," R1-122201, 3GPP TSG RAN WG1 Meeting #69, Agenda Item: 7.6.4.2, Prague, Czech Republic, May 21-25, 2012, pp. 1-4.
Research in Motion, UK Limited, "Multiplexing of E-PDCCH for BF Transmission," R1-113959, 3GPP TSG RAN WG1 Meeting #67, Agenda Item: 7.7.4, San Francisco, USA, Nov. 14-18, 2011, pp. 1-5.
Renesas Mobile Europe Ltd., "Multiplexing of ePDCCHs within a PRB pair," R1-120384, 3GPP TSG-RAN WG1 Meeting #68, Agenda Item: 7.6.4, Dresden, Germany, Feb. 6-10, 2012, 3 pages.
Qualcomm Incorporated, "Search space design for e-PDCCH," R1-114125, 3GPP TSG RAN WG1 #67, Agenda Item: 7.7.3, Nov. 14-18, 2011, San Francisco, USA, 3 pages.

* cited by examiner

| | | NUMBER OF REs |
|---|---|---|
| ▦ | CCE #(4N) | 25REs |
| ▨ | CCE #(4N+1) | 29REs |
| ▦ | CCE #(4N+2) | 29REs |
| ▒ | CCE #(4N+3) | 25REs |

FIG. 4

| | Aggregation level 1 | Aggregation level 2 | Aggregation level 4 | Aggregation level 8 |
|---|---|---|---|---|
| | Only localized | Only localized | Distributed and localized | Only distributed |
| Number of BD trials | 4 | 4 | 4 | 2 |
| | CCE 0 | CCE 1<br>CCE 3 | CCE 2<br>CCE 7<br>CCE 8<br>CCE 13 | CCE 1<br>CCE 3<br>CCE 4<br>CCE 6 |
| | CCE 5 | CCE 4<br>CCE 14 | CCE 1<br>CCE 6<br>CCE 11<br>CCE 12 | CCE 9<br>CCE 11<br>CCE 1<br>CCE 14 |
| | CCE 10 | CCE 9<br>CCE 3 | CCE 0<br>CCE 1<br>CCE 2<br>CCE 3 | CCE 0<br>CCE 1<br>CCE 2<br>CCE 3 |
| | CCE 15 | CCE 12<br>CCE 14 | CCE 8<br>CCE 9<br>CCE 10<br>CCE 11 | CCE 4<br>CCE 5<br>CCE 6<br>CCE 7 |

FIG. 9

| | Aggregation level 1 | Aggregation level 2 | Aggregation level 4 | Aggregation level 8 |
|---|---|---|---|---|
| | Only localized | Only localized | Distributed and localized | Only distributed |
| Number of BD trials | 4 | 4 | 4 | 2 |
| | CCE 0 | CCE 1<br>CCE 3<br>(localized) | CCE 2<br>CCE 7<br>CCE 8<br>CCE 13<br>(distributed) | CCE 1<br>CCE 3<br>CCE 4<br>CCE 6<br>CCE 9<br>CCE 11<br>CCE 12<br>CCE 14<br>(distributed) |
| | CCE 5 | CCE 4<br>CCE 6<br>(localized) | CCE 1<br>CCE 6<br>CCE 11<br>CCE 12<br>(distributed) | |
| | CCE 10 | CCE 9<br>CCE 11<br>(localized) | CCE 0<br>CCE 1<br>CCE 2<br>CCE 3<br>(localized) | CCE 0<br>CCE 2<br>CCE 5<br>CCE 7<br>CCE 8<br>CCE 10<br>CCE 13<br>CCE 15<br>(distributed) |
| | CCE 15 | CCE 12<br>CCE 14<br>(localized) | CCE 8<br>CCE 9<br>CCE 10<br>CCE 11<br>(localized) | |

FIG. 11

|  | Aggregation level 1 | Aggregation level 2 | Aggregation level 4 | Aggregation level 8 |
| --- | --- | --- | --- | --- |
|  | Only localized | Only localized | Distributed and localized | Only distributed |
| Number of BD trials | 4 | 4 | 4 | 2 |
|  | CCE (L) mod 4 | CCE (L+1) mod 4<br>CCE (L+3) mod 4<br>(localized) | CCE (L+2) mod 4<br>CCE (L+3) mod 4+4<br>CCE (L) mod 4+8<br>CCE (L+1) mod 4+12<br>(distributed) | CCE (L+1) mod 4<br>CCE (L+3) mod 4<br>CCE (L) mod 4+4<br>CCE (L+2) mod 4+4<br>CCE (L+1) mod 4+8 |
|  | CCE (L+1) mod 4+4 | CCE (L) mod 4+4<br>CCE (L+2) mod 4+4<br>(localized) | CCE (L+1) mod 4<br>CCE (L+2) mod 4+4<br>CCE (L+3) mod 4+8<br>CCE (L) mod 4+12<br>(distributed) | CCE (L+3) mod 4+8<br>CCE (L) mod 4+12<br>CCE (L+2) mod 4+12<br>(distributed) |
|  | CCE (L+2) mod 4+8 | CCE (L+1) mod 4+8<br>CCE (L+3) mod 4+8<br>(localized) | CCE ((L) mod 4)*4<br>CCE ((L) mod 4)*4+1<br>CCE ((L) mod 4)*4+2<br>CCE ((L) mod 4)*4+3<br>(localized) | CCE (L) mod 4<br>CCE (L+2) mod 4<br>CCE (L+1) mod 4+4<br>CCE (L+3) mod 4+4<br>CCE (L) mod 4+8 |
|  | CCE (L+3) mod 4+12 | CCE (L) mod 4+12<br>CCE (L+2) mod 4+12<br>(localized) | CCE ((L+2) mod 4)*4<br>CCE ((L+2) mod 4)*4+1<br>CCE ((L+2) mod 4)*4+2<br>CCE ((L+2) mod 4)*4+3<br>(localized) | CCE (L+2) mod 4+8<br>CCE (L+1) mod 4+12<br>CCE (L+3) mod 4+12<br>(distributed) |

| | CASE1 | CASE2 | CASE3 | CASE4 |
|---|---|---|---|---|
| CCE #(4N) | K | K+2 | K+2 | K+2 |
| CCE #(4N+1) | K | K | K+2 | K+2 |
| CCE #(4N+2) | K | K | K | K+2 |
| CCE #(4N+3) | K | K | K | K |

FIG. 15B

| | | CASE1 TOTAL OF 2 CCEs | CASE2 TOTAL OF 2 CCEs | CASE3 TOTAL OF 2 CCEs | CASE4 TOTAL OF 2 CCEs |
|---|---|---|---|---|---|
| Aggregation level 2 | CCE #(4N), CCE #(4N+3) | 2K | 2K+2 | 2K+2 | 2K+2 |
| Aggregation level 2 | CCE #(4N+1), CCE #(4N+2) | 2K | 2K | 2K+2 | 2K+4 |

| | Aggregation level 1 | Aggregation level 2 | Aggregation level 4 | Aggregation level 8 |
|---|---|---|---|---|
| | Only localized | Only localized | Distributed and localized | Only distributed |
| Number of BD trials | 4 | 4 | 4 | 2 |
| | CCE 0 | CCE 1<br>CCE 2<br>(localized) | CCE 3<br>CCE 6<br>CCE 9<br>CCE 12<br>(distributed) | CCE 1<br>CCE 2<br>CCE 4<br>CCE 7<br>CCE 8<br>CCE 11<br>CCE 13<br>CCE 14<br>(distributed) |
| | CCE 5 | CCE 4<br>CCE 7<br>(localized) | CCE 0<br>CCE 5<br>CCE 10<br>CCE 15<br>(distributed) | |
| | CCE 10 | CCE 8<br>CCE 11<br>(localized) | CCE 0<br>CCE 1<br>CCE 2<br>CCE 3<br>(localized) | CCE 0<br>CCE 3<br>CCE 5<br>CCE 6<br>CCE 9<br>CCE 10<br>CCE 12<br>CCE 15<br>(distributed) |
| | CCE 15 | CCE 13<br>CCE 14<br>(localized) | CCE 8<br>CCE 9<br>CCE 10<br>CCE 11<br>(localized) | |

FIG. 16

| | Aggregation level 1 | Aggregation level 2 | Aggregation level 4 | Aggregation level 8 |
|---|---|---|---|---|
| | Only localized | Only localized | Distributed and localized | Only distributed |
| Number of BD trials | 4 | 4 | 4 | 2 |
| | CCE (L) mod 4 | If (CCE (L) mod 4) mod 4=0 or 3 CCE#1, CCE#2<br><br>If (CCE (L) mod 4) mod 4=1 or 2 CCE#0, CCE#3 | EXPRESSION 2 | EXPRESSION 3 |
| | CCE (L+1) mod 4+4 | If (CCE (L+1) mod 4+4) mod 4=0 or 3 CCE#5, CCE#6<br><br>If (CCE (L+1) mod 4+4) mod 4=1 or 2 CCE#4, CCE#7 | CCE (L) mod 4<br><br>CCE (L+1) mod 4+4<br><br>CCE (L+2) mod 4+8<br><br>CCE (L+3) mod 4+12 | |
| | CCE (L+2) mod 4+8 | If (CCE (L+2) mod 4+8) mod 4=0 or 3 CCE#9, CCE#10<br><br>If (CCE (L+2) mod 4+8) mod 4=1 or 2 CCE#8, CCE#11 | CCE ((L) mod 4)*4<br><br>CCE ((L) mod 4)*4+1<br><br>CCE ((L) mod 4)*4+2<br><br>CCE ((L) mod 4)*4+3<br><br>(localized) | EXPRESSION 4 |
| | CCE (L+3) mod 4+12 | If (CCE (L+3) mod 4+12) mod 4=0 or 3 CCE#13, CCE#14<br><br>If (CCE (L+3) mod 4+12) mod 4=1 or 2 CCE#12, CCE#15 | CCE ((L+2) mod 4)*4<br><br>CCE ((L+2) mod 4)*4+1<br><br>CCE ((L+2) mod 4)*4+2<br><br>CCE ((L+2) mod 4)*4+3<br><br>(localized) | |

FIG. 17

| Aggregation level 4 DL assignment | Aggregation level 4 UL grant | Aggregation level 8 DL assignment UL grant |
|---|---|---|
| CCE 0<br>CCE 5<br>CCE 10<br>CCE 15<br>(distributed) | CCE 2<br>CCE 7<br>CCE 8<br>CCE 13<br>(distributed) | CCE 1<br>CCE 3<br>CCE 4<br>CCE 6<br>CCE 9<br>CCE 11<br>CCE 12<br>CCE 14<br>(distributed) |
| CCE 3<br>CCE 4<br>CCE 9<br>CCE 14<br>(distributed) | CCE 1<br>CCE 6<br>CCE 11<br>CCE 12<br>(distributed) | CCE 0<br>CCE 2<br>CCE 5<br>CCE 7<br>CCE 8<br>CCE 10<br>CCE 13<br>CCE 15<br>(distributed) |
| CCE 4<br>CCE 5<br>CCE 6<br>CCE 7<br>(localized) | CCE 0<br>CCE 1<br>CCE 2<br>CCE 3<br>(localized) | |
| CCE 12<br>CCE 13<br>CCE 14<br>CCE 15<br>(localized) | CCE 8<br>CCE 9<br>CCE 10<br>CCE 11<br>(localized) | |

FIG. 19

| | Aggregation level 1 | Aggregation level 2 | Aggregation level 4 | Aggregation level 8 |
|---|---|---|---|---|
| | Only localized | Only localized | Only distributed | Only distributed |
| Number of BD trials | 6 | 6 | 2 | 2 |
| | CCE 0 | CCE 1, CCE 2 | CCE 2, CCE 7, CCE 12, CCE 0 | CCE 2, CCE 3, CCE 7, CCE 11, CCE 12, CCE 16 |
| | CCE 4 | CCE 3, CCE 5 | | |
| | CCE 8 | CCE 6, CCE 7 | | CCE 0, CCE 4 |
| | CCE 9 | CCE 10, CCE 14 | | CCE 8, CCE 9 |
| | CCE 13 | CCE 12, CCE 14 | CCE 8, CCE 13, CCE 1, CCE 6 | CCE 13, CCE 17, CCE 1, CCE 5 |
| | CCE 17 | CCE 15, CCE 16 | | CCE 6, CCE 10 |

FIG. 21

TRANSMITTING DEVICE, RECEIVING DEVICE, TRANSMITTING METHOD, AND RECEIVING METHOD

TECHNICAL FIELD

The present invention relates to a transmission apparatus, a reception apparatus, a transmission method, and a reception method.

BACKGROUND ART

In recent years, accompanying the adoption of multimedia information in cellular mobile communication systems, it has become common to transmit not only speech data but also a large amount of data such as still image data and moving image data. Furthermore, studies are being actively conducted in LTE-Advanced (Long Term Evolution Advanced) to realize high transmission rates by utilizing broad radio bands, Multiple-Input Multiple-Output (MIMO) transmission technology, and interference control technology.

In addition, taking into consideration the introduction of various devices as radio communication terminals in M2M (machine to machine) communication and the like as well as an increase in the number of multiplexing target terminals due to MIMO transmission technology, there is a concern regarding a shortage of resources in a mapping region for a PDCCH (Physical Downlink Control Channel) that is used for a control signal (that is, a "PDCCH region"). If a control signal (PDCCH) cannot be mapped due to such a resource shortage, downlink data cannot be assigned to the terminals. Therefore, even if a resource region in which downlink data is to be mapped (i.e., a "PDSCH (Physical Downlink Shared Channel) region") is available, the resource region may not be used, which causes a decrease in the system throughput.

As a method for solving such a resource shortage, a study is being made of assigning, in a data region, control signals for terminals served by a radio base station apparatus (hereunder, abbreviated as "base station"). A resource region in which control signals for terminals served by the base station are mapped is referred to as an Enhanced PDCCH (ePDCCH) region, a New-PDCCH (N-PDCCH) region, an X-PDCCH region or the like. Mapping the control signal (i.e., ePDCCH) in a data region as described above enables transmission power control on control signals transmitted to a terminal near a cell edge or interference control for interference by a control signal to another cell or interference from another cell to the cell provided by the base station.

Further, according to the LTE-Advanced system, to expand the coverage area of each base station, relay technology is being studied in which a radio communication relay station apparatus (hereunder, abbreviated as "relay station") is installed between a base station and radio communication terminal apparatuses (hereunder, abbreviated as "terminals"; may also be referred to as UE (user equipment)), and communication between the base station and terminals is performed via the relay station. The use of relay technology allows a terminal that cannot communicate with the base station directly to communicate with the base station via the relay station. According to the relay technology that has been introduced in the LTE-Advanced system, control signals for relay are assigned in a data region. Since it is expected that the control signals for relay may be extended for use as control signals for terminals, a resource region in which control signals for relay are mapped is also referred to as an "R-PDCCH."

In the LTE (Long Term Evolution) system, a DL grant (also referred to as "DL assignment"), which indicates a downlink (DL) data assignment, and a UL grant, which indicates an uplink (UL) data assignment are transmitted through a PDCCH. The DL grant indicates to the terminal that a resource in the subframe in which the DL grant is transmitted has been allocated to the terminal. In an FDD system, the UL grant indicates that a resource in a target subframe that is the fourth subframe after the subframe in which the UL grant is transmitted has been allocated to the terminal. In a TDD system, the UL grant indicates that the resource in a target subframe that is the fourth or a subframe subsequent to the fourth subframe after the subframe in which the UL grant is transmitted has been allocated to the terminal. In the TDD system, which one of subframes located after the subframe in which the UL grant is transmitted is to be taken as the target subframe to be assigned to the terminal depends on the time-division pattern of the uplink and downlink (hereinafter referred to as "UL/DL configuration pattern"). However, in every UL/DL configuration pattern, the UL subframe is the fourth subframe after the subframe in which the UL grant is transmitted or a subframe subsequent to the fourth subframe.

In the LTE-Advanced system, a region (R-PDCCH for relay station (relay PDCCH) region) in which channel control signals for relay stations are mapped is provided in the data region. Similarly to the PDCCH, a DL grant and a UL grant are mapped to the R-PDCCH. In the R-PDCCH, the DL grant is mapped in the first slot and the UL grant is mapped in the second slot (refer to Non-Patent Literature "hereunder abbreviated as NPL" 1). Mapping the DL grant only in the first slot reduces a delay in decoding the DL grant, and allows relay stations to prepare for ACK/NACK transmission for DL data (transmitted in the fourth subframe following reception of the DL grant in FDD). Thus, each relay station monitors channel control signals transmitted using an R-PDCCH from a base station within a resource region indicated by higher layer signaling from the base station (i.e., a "search space") and thereby finds the channel control signal intended for the corresponding relay station.

In this case, the base station indicates the search space corresponding to the R-PDCCH to the relay station by higher layer signaling.

In the LTE and LTE-Advanced systems, one RB (resource block) has 12 subcarriers in the frequency domain and has a width of 0.5 msec in the time domain. A unit in which two RBs are combined in the time domain is referred to as an RB pair (for example, see FIG. 1). That is, an RB pair has 12 subcarriers in the frequency domain, and has a width of 1 msec in the time domain. When an RB pair represents a group of 12 subcarriers on the frequency axis, the RB pair may be referred to as simply "RB." In addition, in a physical layer, an RB pair is also referred to as a PRB pair (physical RB pair). A resource element (RE) is a unit defined by a single subcarrier and a single OFDM symbol (see FIG. 1).

The number of OFDM symbols per RB pair changes depending on the CP (cyclic prefix) length of the OFDM symbols. Further, the number of REs of a resource region in which an ePDCCH is mapped per RB pair differs depending on the number of OFDM symbols and the number of REs used for a reference signal (RS).

The number of OFDM symbols and a reference signal that can be used vary for each subframe. Accordingly, in a subframe having a small number of REs of a resource region in which an ePDCCH is mapped in a single RB pair, the ePDCCH reception quality decreases.

Further, the number of OFDM symbols used for a PDCCH is variable between one and four. Accordingly, in a case where a PDCCH region is not configured for an ePDCCH, the number of OFDM symbols that can be used for an ePDCCH decreases as the number of OFDM symbols of the PDCCH region increases.

Further, the number of REs to be used for a reference signal differs according to the configuration of the reference signal as described below (see FIG. 1).

(1) CRS (1, 2, 4 Tx):

A CRS (cell specific reference signal) is transmitted in all RBs. Although a CRS may also be transmitted in a data region in a subframe other than an MBSFN subframe, in an MBSFN subframe, a CRS is transmitted using only the first two OFDM symbols. The position at which the CRS is mapped varies depending on the cell ID.

(2) DMRS (12 REs, 24 REs or 16 REs):

Utilization of a DMRS (demodulation reference signal) is dynamically indicated to the terminal from the base station by downlink assignment control information (DL assignment). The number of DMRSs that are configured can be varied for each user. The DMRS is transmitted in a data region.

(3) CSI-RS (2 REs or More):

A CSI-RS (channel state information reference signal) is transmitted in all RBs. The subframe to be transmitted depends on a predetermined period.

A PDCCH and an R-PDCCH have four aggregation levels, i.e., levels 1, 2, 4, and 8 (for example, see NPL 1). Levels 1, 2, 4, and 8 have six, six, two, and two "mapping candidates," respectively. As used herein, the term "mapping candidate" refers to a candidate region to which a control signal is to be mapped, and a search space is formed by a plurality of mapping candidates. When a single aggregation level is configured for a single terminal, a control signal is actually mapped to one of the plurality of mapping candidates of the aggregation level. FIG. 2 illustrates an example of search spaces corresponding to an R-PDCCH. The ovals represent search spaces for each of the aggregation levels. The multiple mapping candidates in each search space for each aggregation level are located in a consecutive manner on VRBs (virtual resource blocks). The resource region candidates in the VRBs are mapped to PRBs (physical resource blocks) through higher layer signaling.

Studies are being conducted with respect to individually configuring search spaces corresponding to ePDCCHs for terminals. Further, with respect to the design of ePDCCHs, part of the design of the R-PDCCH described above can be used, and a design that is completely different from the R-PDCCH design can also be adopted. In fact, studies are also being conducted with regard to making the design of ePDCCHs and the design of R-PDCCHs different from each other.

As described above, a DL grant is mapped to the first slot and a UL grant is mapped to the second slot in an R-PDCCH region. That is, a resource to which the DL grant is mapped and a resource to which the UL grant is mapped are divided on the time axis. In contrast, for ePDCCHs, studies are being conducted with regard to dividing resources to which DL grants are mapped and UL grants are mapped on the frequency axis (that is, subcarriers or PRB pairs), and with regard to dividing REs within an RB pair into a plurality of groups.

CITATION LIST

Non-Patent Literature

NPL 1
3GPP TS 36.216 V10.1.0, "Physical layer for relaying operation"

SUMMARY OF INVENTION

Technical Problem

For example, with respect to ePDCCHs, studies are being conducted with regard to dividing each PRB pair into a plurality of resources. Resources obtained by division within an RB pair are referred to as CCEs (control channel elements). Although the number of REs forming a single CCE in a PDCCH is configured to a fixed number of 36 REs, the number of REs forming a single CCE in this case varies depending on the division method. Possible division methods include a method that divides resources on a per subcarrier basis and a method that divides resources by generating groups of resources (REs).

Depending on the number of REs in a PRB pair, the number of resource divisions in a PRB pair, or the division method, in some cases the numbers of REs of the respective CCEs in a PRB pair are not uniform. For example, FIG. 3 illustrates an example in which a plurality of PRB pairs #A to #D are configured in the search spaces of ePDCCHs, in which each PRB pair is divided into four CCEs in subcarrier units (for every three subcarriers). In FIG. 3, the CCEs into which each PRB pair is divided are referred to as CCE #(4N), CCE #(4N+1), CCE #(4N+2), and CCE #(4N+3), respectively (where N=0, 1, 2, 3). In FIG. 3, the first two OFDM symbols are used for a PDCCH, and the remaining 12 OFDM symbols are used for an ePDCCH. In addition, as shown in FIG. 3, among the OFDM symbols used for an ePDCCH, as REs to be used for a reference signal (CRS or DMRS), a CRS is located in an amount corresponding to two ports, and a DMRS is located in an amount corresponding to four ports. Among the REs (144 REs) forming the OFDM symbols used for an ePDCCH, the number of REs that can be used for an ePDCCH is 108 REs.

FIG. 4 shows the total number of REs forming the four CCEs in each PRB pair shown in FIG. 3. As shown in FIG. 4, CCE #(4N) includes 25 REs, CCE #(4N+1) includes 29 REs, CCE #(4N+2) includes 29 REs, and CCE #(4N+3) includes 25 REs. That is, there is an inequality in the number of REs forming each CCE in one PRB pair. Consequently, the ePDCCH reception characteristics vary according to which CCE is used. In particular, when a different search space is configured for each terminal, if there is a terminal configured with a search space having a small number of REs and a terminal configured with a search space having a large number of REs, the ePDCCH reception characteristics vary between the terminals, which is unfair to the terminal configured with a search space having a smaller number of REs.

An object of the present invention is to provide a transmission apparatus, a reception apparatus, a transmission method, and a reception method that can equalize resources available for ePDCCHs among terminals and reduce an inequality in the reception characteristics of control information.

Solution to Problem

A transmission apparatus according to an aspect of the present invention includes: a configuration section that configures a search space formed by a plurality of mapping candidates based on an aggregation level value, each of the plurality of mapping candidates being formed by the same number of control channel elements as the aggregation level value, the control channel elements being obtained by dividing each physical resource block into a predetermined number of parts; and a transmission section that transmits control information mapped to one of the plurality of mapping candidates in the configured search space, in which: the numbers of resource elements included in the predetermined number of control channel elements in each of the physical resource blocks take at least two kinds of values; and the configuration section configures the search space so that, in a search space for which the aggregation level value is at least two, among the plurality of mapping candidates, a difference between total numbers of elements included in control channel elements forming the mapping candidates is minimized.

A reception apparatus according to an aspect of the present invention includes: a configuration section that configures a search space formed by a plurality of mapping candidates based on an aggregation level value, each of the plurality of mapping candidates being formed by the same number of control channel elements as the aggregation level value, the control channel elements being obtained by dividing each physical resource block into a predetermined number of parts; and a reception section that receives control information mapped to one of the plurality of mapping candidates forming the configured search space, in which: the numbers of resource elements included in the predetermined number of control channel elements in each of the physical resource blocks take at least two kinds of values; and the configuration section configures the search space so that, among the plurality of mapping candidates forming each search space for which the aggregation level value is at least two, a difference between total numbers of elements included in control channel elements forming the mapping candidates is minimized.

A transmission method according to an aspect of the present invention includes: configuring a search space formed by a plurality of mapping candidates based on an aggregation level value, each of the plurality of mapping candidates being formed by the same control channel elements as the aggregation level value, the control channel elements being obtained by dividing each physical resource block into a predetermined number of parts; transmitting control information mapped to one of the plurality of mapping candidates in the configured search space; causing the numbers of elements included in the predetermined number of control channel elements in each of the physical resource blocks to take at least two kinds of values; and configuring the search space so that, in each search space for which the aggregation level value is at least two, among the plurality of mapping candidates, a difference between total numbers of elements included in control channel elements forming the mapping candidates is minimized.

A reception method according to an aspect of the present invention includes: configuring a search space formed by a plurality of mapping candidates based on an aggregation level value, each of the plurality of mapping candidates being formed by the same number of control channel elements as the aggregation level value, the control channel elements being obtained by dividing each physical resource block into a predetermined number of parts; receiving control information mapped to one of the plurality of mapping candidates forming the configured search space; causing the numbers of elements included in the predetermined number of control channel elements in each of the physical resource blocks to take at least two kinds of values; and configuring the search space so that, in each search space for which the aggregation level value is at least two, among the plurality of mapping candidates, a difference between total numbers of elements included in control channel elements forming the mapping candidates is minimized.

Advantageous Effects of Invention

According to the present invention, an inequality in reception characteristics of control information can be reduced by equalizing resources available for ePDCCHs among terminals.

BRIEF DESCRIPTION OF DRAWINGS

FIG. 4 shows the number of REs forming each CCE;

FIG. 9 illustrates a search space configuration example according to Embodiment 1 of the present invention (configuration example 1);

FIG. 11 illustrates another search space configuration example according to Embodiment 1 of the present invention (configuration example 2);

FIG. 12 illustrates still another search space configuration example according to Embodiment 1 of the present invention (configuration example 2);

FIGS. 15A and 15B show the numbers of REs forming CCEs according to Embodiment 1 of the present invention (configuration example 4);

FIG. 16 illustrates a search space configuration example according to Embodiment 1 of the present invention (configuration example 4);

FIG. 17 illustrates a search space configuration example according to Embodiment 1 of the present invention (configuration example 4);

FIG. 19 illustrates a search space configuration example according to Embodiment 2 of the present invention;

FIG. 21 illustrates a search space configuration example according to Embodiment 3 of the present invention.

DESCRIPTION OF EMBODIMENTS

Figure 1:
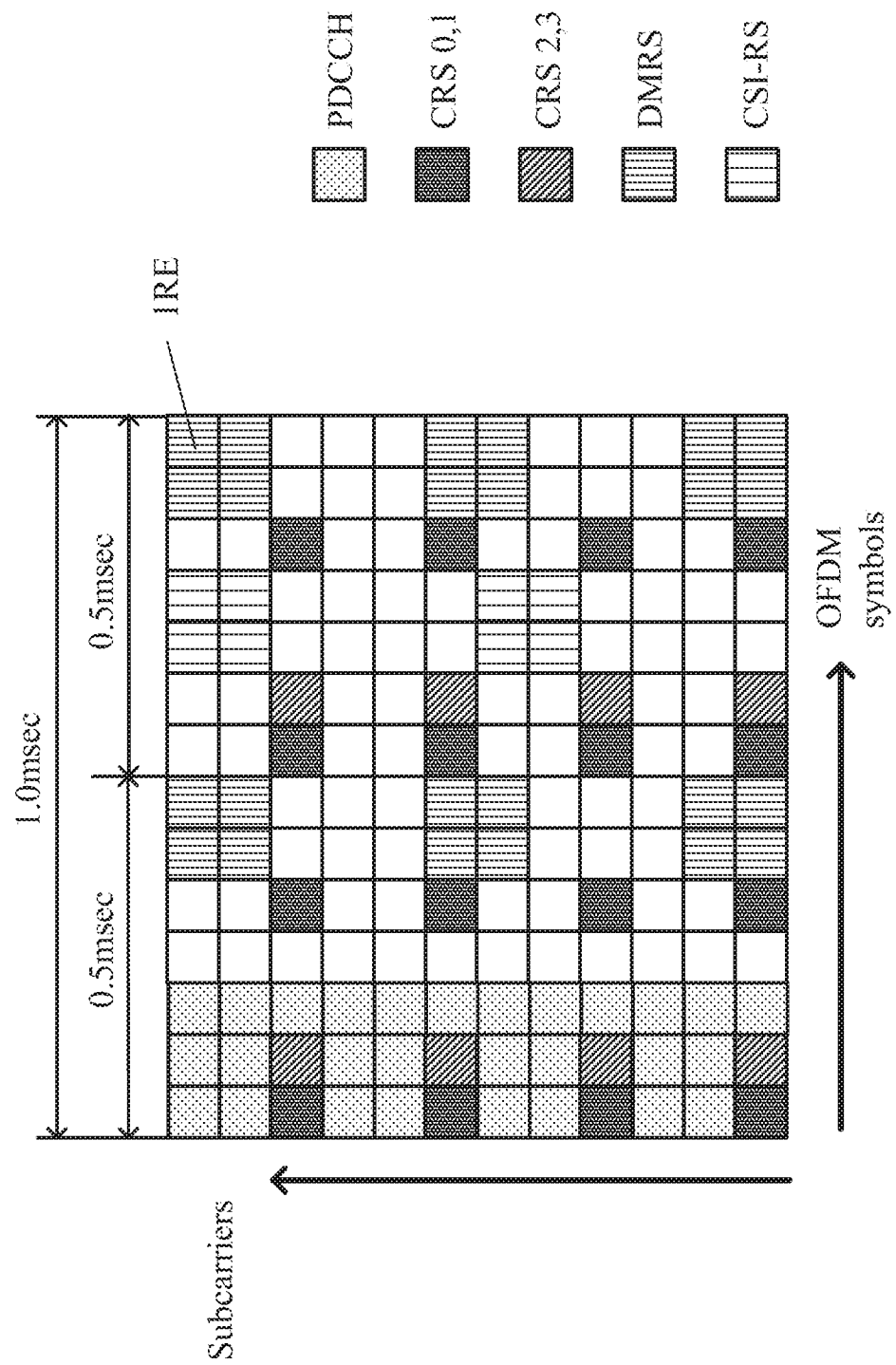
FIG. 1 is a diagram provided for describing a PRB pair.
Figure 2:
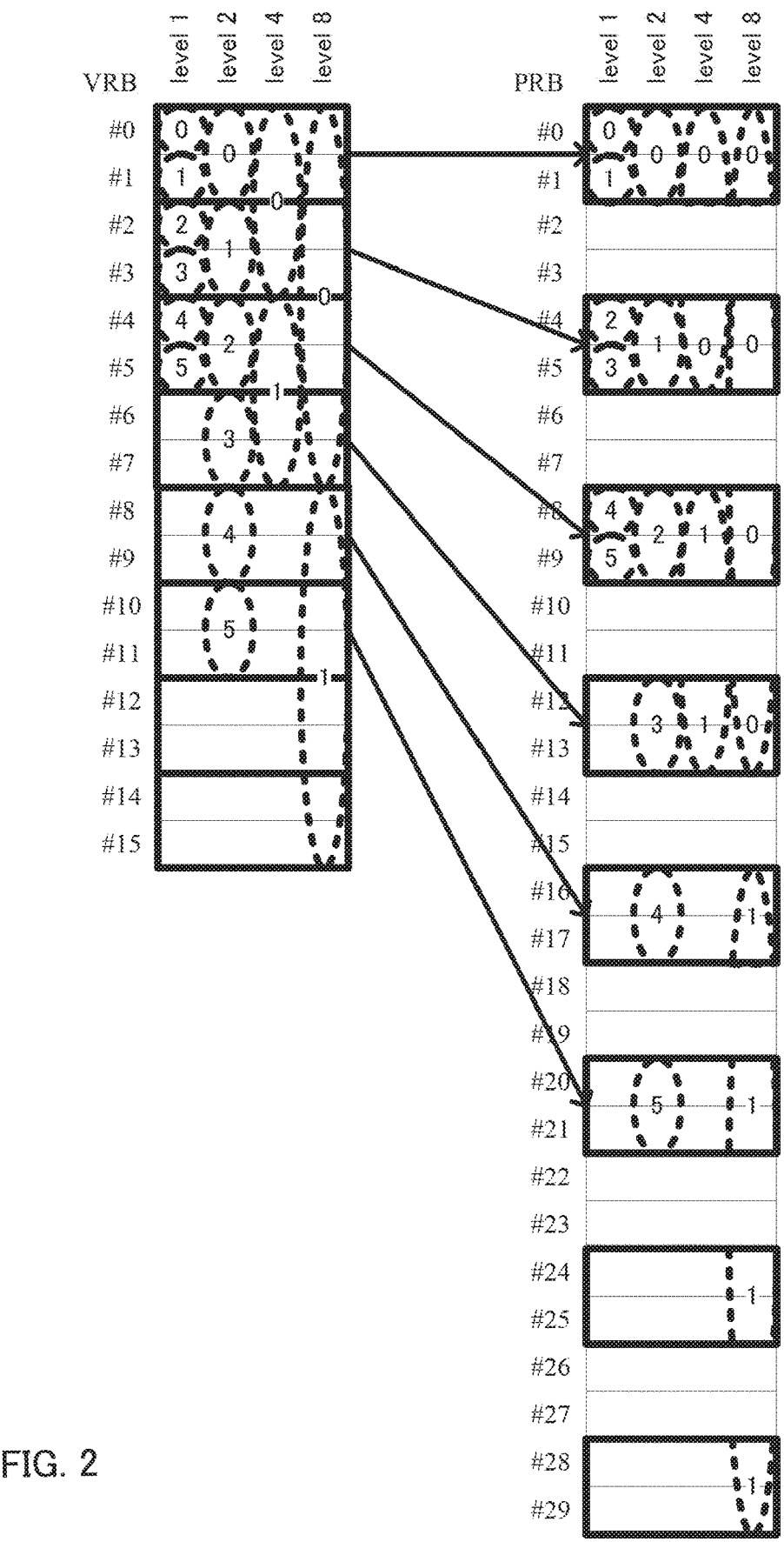
FIG. 2 illustrates an example of search spaces corresponding to R-PDCCHs.

Embodiments of the present invention are described in detail hereunder with reference to the accompanying drawings. Throughout the embodiments, the same elements are assigned the same reference numerals, and a duplicate description of the elements is omitted

Embodiment 1

[Communication System Overview]

A communication system according to the present embodiment includes a transmission apparatus and a reception apparatus. In particular, the present embodiment is described by taking base station 100 as the transmission apparatus and taking terminal 200 as the reception apparatus. The communication system is, for example, an LTE-Advanced system. Base station 100 is, for example, a base station that supports the LTE-Advanced system, and terminal 200 is, for example, a terminal that supports the LTE-Advanced system.

Figure 5:
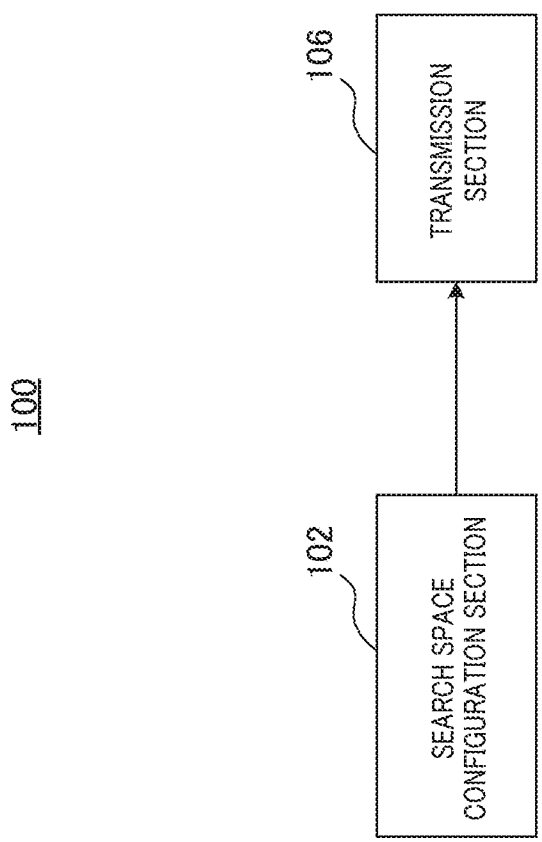
FIG. 5 is a block diagram illustrating main components of a base station according to Embodiment 1 of the present invention.

FIG. 5 is a block diagram illustrating main components of base station 100 according to the present embodiment.

In base station 100, search space configuration section 102 configures search spaces formed by a plurality of "mapping candidates" based on aggregation level values. Each mapping candidate is formed of the same number of CCEs (control channel elements) as the aggregation level value. The CCEs are obtained by dividing each PRB (physical channel resource block) pair into a predetermined number of parts. The number of REs (resource elements) included in each of a predetermined number of CCEs in each PRB pair takes at least two kinds of values. Search space configuration section 102 configures search spaces so that, in each search space for which the aggregation level value is two or more, among a plurality of mapping candidates, a difference between the total numbers of REs included in CCEs forming the mapping candidates is minimized.

Transmission section 106 transmits control information (DL assignment and UL grant or the like) mapped to one mapping candidate among a plurality of mapping candidates in a search space configured by search space configuration section 102.

Figure 6:
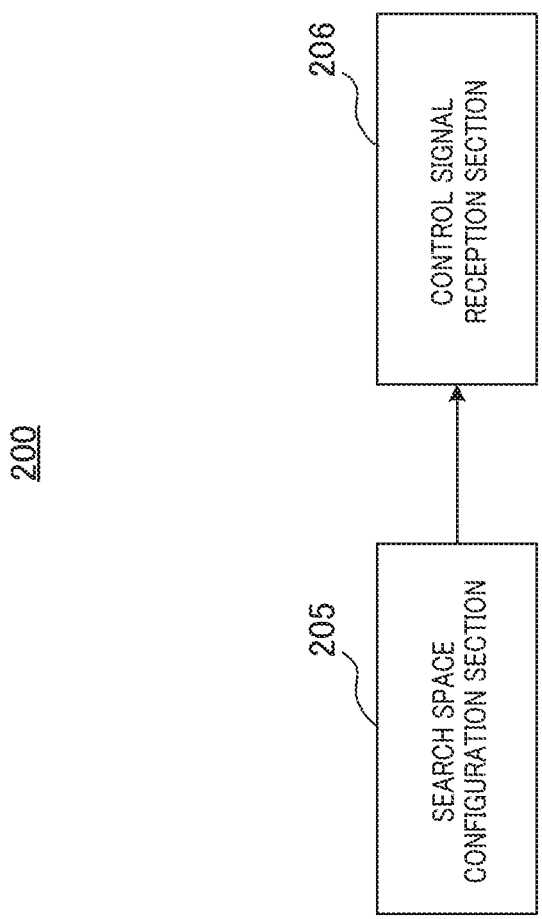
FIG. 6 is a block diagram illustrating main components of a terminal according to Embodiment 1 of the present invention.

FIG. 6 is a block diagram illustrating main components of terminal 200 according to the present embodiment.

Search space configuration section 205 in terminal 200 configures search spaces formed by a plurality of "mapping candidates" based on aggregation level values. Each mapping candidate is formed of the same number of CCEs (control channel elements) as the aggregation level value. The CCEs are obtained by dividing each PRB (physical channel resource block) pair into a predetermined number of parts. The number of REs (resource elements) included in each of a predetermined number of CCEs in each PRB pair takes at least two kinds of values. Search space configuration section 205 configures search spaces so that, in each search space for which the aggregation level value is two or more, among a plurality of mapping candidates, a difference between the total numbers of REs included in CCEs forming the mapping candidates is minimized.

Control signal reception section 206 extracts control information (control signal) mapped to one mapping candidate among a plurality of mapping candidates forming a search space configured by search space configuration section 205. As a result, control information (DL assignment and UL grant or the like) transmitted from base station 100 is received.

[Configuration of Base Station 100]

Figure 7:
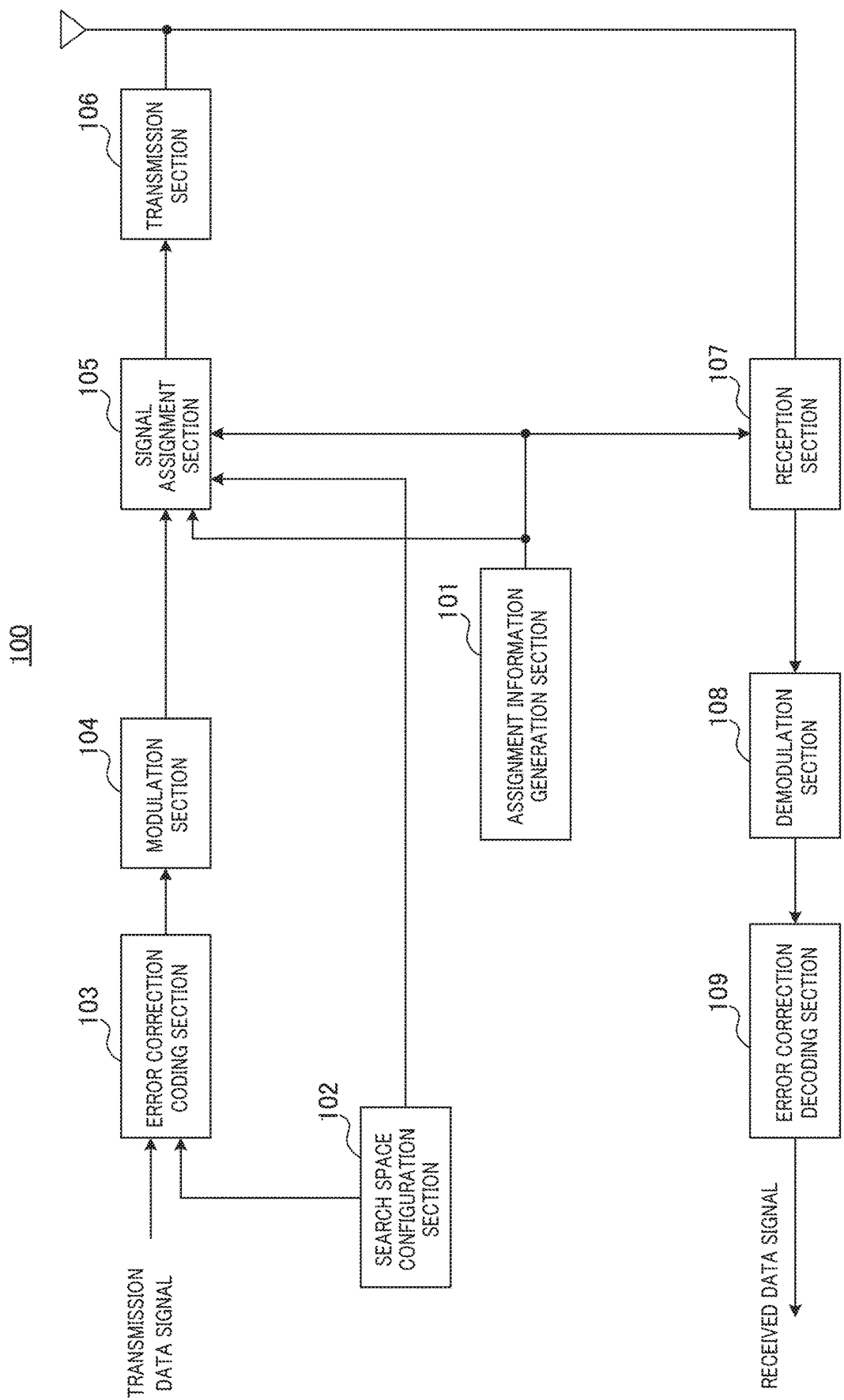
FIG. 7 is a block diagram illustrating the configuration of the base station according to Embodiment 1 of the present invention.

FIG. 7 is a block diagram illustrating the configuration of base station 100 according to the present embodiment. As shown in FIG. 7, base station 100 includes assignment information generation section 101, search space configuration section 102, error correction coding section 103, modulation section 104, signal assignment section 105, transmission section 106, reception section 107, demodulation section 108, and error correction decoding section 109.

In a case where there is a downlink data signal (DL data signal) to be transmitted and an uplink data signal (UL data signal) to be assigned to an uplink (UL), assignment information generation section 101 determines resources (RB) to which assign the data signals are assigned, and generates assignment information (DL assignment and UL grant). The DL assignment includes information relating to assignment of the DL data signal. The UL grant includes information relating to allocated resources for the UL data signal to be transmitted from terminal 200. The DL assignment is outputted to signal assignment section 105, and the UL grant is outputted to reception section 107.

Based on aggregation level values, search space configuration section 102 configures search spaces formed by a plurality of mapping candidates for each terminal 200 that uses an ePDCCH. Each "mapping candidate" is formed by the same number of CCEs as the aggregation level value. The "CCEs" are obtained by dividing each PRB pair into a predetermined number of parts.

For example, based on a value by which terminal 200 can be identified and a calculation formula that search space configuration section 102 holds in advance, search space configuration section 102 determines a search space (CCEs to be used in a search space) that is configured for the relevant terminal 200. For example, a CRNTI (Cell Radio Network Temporary Identifier) that is indicated to terminal 200 from base station 100 at the start of communication may be mentioned as a value by which terminal 200 can be identified. The aforementioned calculation formula is shared between base station 100 and terminal 200.

The aforementioned calculation formula is used to calculate CCEs forming search spaces to be configured for each terminal 200 so that an inequality does not arise with respect to the number of REs included in CCEs configured in the search spaces among the terminals 200. More specifically, for aggregation level 1 (number of CCEs forming a mapping candidate: 1), search space configuration section 102 configures CCEs in which the numbers of REs are different from each other as a plurality of mapping candidates to be configured for one terminal 200. Further, for aggregation levels 2, 4, and 8 (number of CCEs forming a mapping candidate: 2, 4, and 8), among a plurality of mapping candidates to be configured for one terminal 200, search space configuration section 102 configures CCEs in such a way that the CCEs include a CCE in which the number of REs is different from the others as at least one mapping candidate. Note that processing to configure a search space performed by search space configuration section 102 is described in detail later.

Search space configuration section 102 outputs information relating to a configured search space (hereunder, may also be referred to as "search space information") to signal assignment section 105. Search space configuration section 102 also outputs information relating to PRB pairs that have been configured in a search space to error correction coding section 103 as control information.

Error correction coding section 103 receives a transmission data signal (DL data signal) and control information received from search space configuration section 102 as input signals, performs error correction coding on the input signals, and outputs the processed signals to modulation section 104.

Modulation section 104 modulates the signals received from error correction coding section 103, and outputs the modulated data signal to signal assignment section 105.

Signal assignment section 105 assigns the assignment information (DL assignment and UL grant) received from assignment information generation section 101 to any CCE among CCEs (CCEs in mapping candidate units) indicated by search space information received from search space configuration section 102. Signal assignment section 105 also assigns the data signal received from modulation section 104 to a downlink resource corresponding to the assignment information (DL assignment) received from assignment information generation section 101.

A transmission signal is formed by assignment information and a data signal being assigned to predetermined resources in this manner. The thus-formed transmission signal is outputted to transmission section 106.

Transmission section 106 executes radio transmission processing such as up-conversion on the input signal, and transmits the obtained signal to terminal 200 via an antenna.

Reception section 107 receives a signal transmitted from terminal 200 via an antenna, and outputs the received signal to demodulation section 108. More specifically, reception section 107 separates a signal that corresponds to a resource indicated by a UL grant received from assignment information generation section 101 from the received signal, and executes reception processing such as down-conversion on the separated signal and thereafter outputs the obtained signal to demodulation section 108.

Demodulation section 108 executes demodulation processing on the input signal, and outputs the obtained signal to error correction decoding section 109.

Error correction decoding section 109 decodes the input signal to obtain the received data signal from terminal 200.

[Configuration of Terminal 200]

Figure 8:
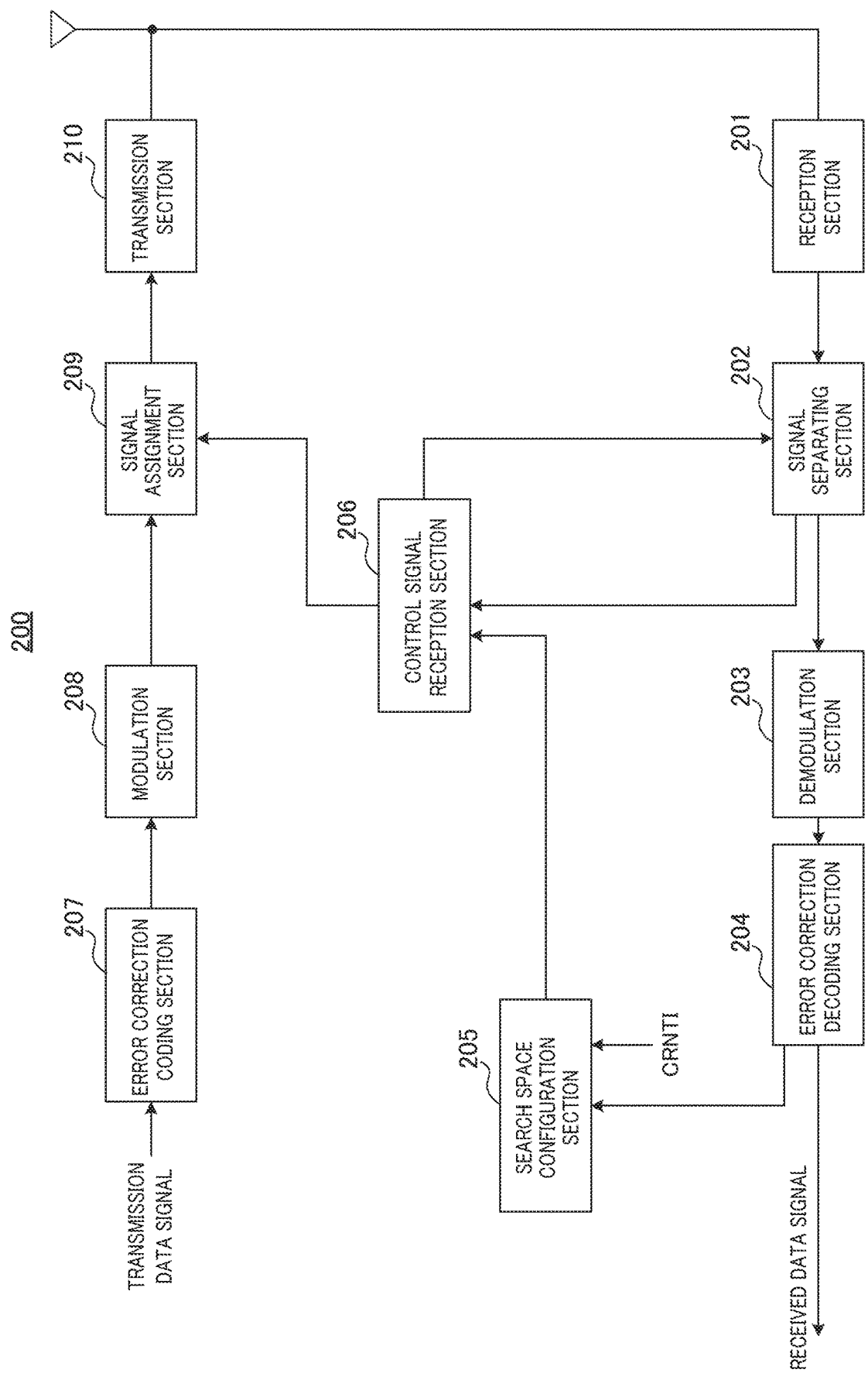
FIG. 8 is a block diagram illustrating the configuration of the terminal according to Embodiment 1 of the present invention.

FIG. 8 is a block diagram illustrating the configuration of terminal 200 according to the present embodiment. As shown in FIG. 8, terminal 200 includes reception section 201, signal separating section 202, demodulation section 203, error correction decoding section 204, search space configuration section 205, control signal reception section 206, error correction coding section 207, modulation section 208, signal assignment section 209, and transmission section 210.

Reception section 201 receives a signal transmitted from base station 100 via an antenna, and after executing reception processing such as down-conversion thereon, outputs the processed signal to signal separating section 202.

Signal separating section 202 extracts a control signal relating to resource allocation from the reception signal received from reception section 201, and outputs the extracted signal to control signal reception section 206. Signal separating section 202 also extracts from the reception signal a signal corresponding to a data resource (that is, a DL data signal) indicated by the DL assignment output from control signal reception section 206, and outputs the extracted signal to demodulation section 203.

Demodulation section 203 demodulates the signal outputted from signal separating section 202, and outputs the demodulated signal to error correction decoding section 204.

Error correction decoding section 204 decodes the demodulated signal outputted from demodulation section 203, and outputs the obtained received data signal. In particular, error correction decoding section 204 outputs "information relating to PRB pairs configured in a search space" transmitted as a control signal from base station 100, to search space configuration section 205.

Search space configuration section 205 identifies a search space configured for terminal 200 of search space configuration section 205 that uses an ePDCCH. For example, first, based on information received from error correction decoding section 204, search space configuration section 205 determines PRB pairs to configure in the search space. Next, based on a value (for example, a CRNTI) by which terminal 200 of search space configuration section 205 can be identified and a calculation formula that search space configuration section 205 holds in advance, search space configuration section 205 determines a search space (CCEs to be used for a search space) that has been configured for the relevant terminal 200. The aforementioned calculation formula is shared between base station 100 and terminal 200. That is, in a similar manner to search space configuration section 102, search space configuration section 205 configures a search space of terminal 200 thereof. Search space configuration section 205 outputs information relating to CCEs configured as the search space to control signal reception section 206. Note that search space configuration processing performed by search space configuration section 205 is described in detail later.

In a signal component received from signal separating section 202, control signal reception section 206 detects a control signal (DL assignment or UL grant) intended for terminal 200 of signal separating section 202 by performing blind decoding with respect to CCEs indicated by information received from search space configuration section 205. That is, control signal reception section 206 receives a control signal mapped to one mapping candidate among a plurality of mapping candidates forming a search space configured by search space configuration section 205. Control signal reception section 206 outputs a detected DL assignment intended for terminal 200 of control signal reception section 206 to signal separating section 202, and outputs a detected UL grant intended for terminal 200 thereof to signal assignment section 209.

When a transmission data signal (UL data signal) is inputted to error correction coding section 207, error correction coding section 207 performs error correction coding on the transmission data signal and outputs the obtained signal to modulation section 208.

Modulation section 208 modulates the signal outputted from error correction coding section 207, and outputs the modulated signal to signal assignment section 209.

Signal assignment section 209 assigns the signal outputted from modulation section 208 according to the UL grant received from control signal reception section 206, and outputs the obtained signal to transmission section 210.

Transmission section 210 executes transmission processing such as up-conversion on the input signal, and transmits the obtained signal.

[Operations of Base Station 100 and Terminal 200]

Operations of base station 100 and terminal 200 that have the above configurations will be described.

Figure 3:
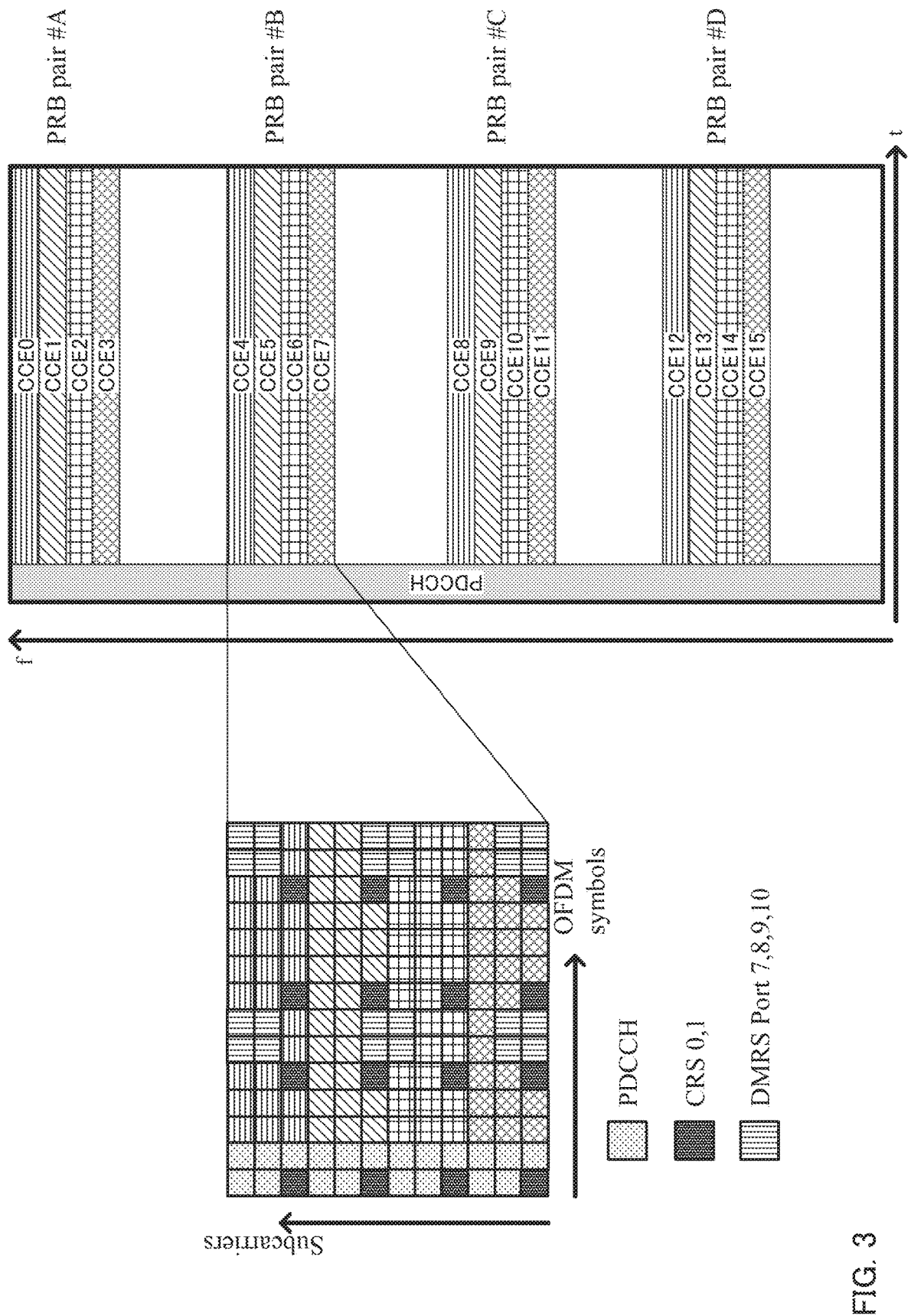
FIG. 3 illustrates an example of mapping of CCEs.

In the following description, for example, as shown in FIG. 3, PRB pairs #A to #D are configured as resources that can be used as ePDCCHs. Further, as shown in FIG. 3, each PRB pair is divided into four CCEs. More specifically, PRB pair #A includes CCE 0 to CCE 3, PRB pair #B includes CCE 4 to CCE 7, PRB pair #C includes CCE 8 to CCE 11, and PRB pair #D includes CCE 12 to CCE 15.

That is, in the following description, as shown in FIG. 4, the number of REs included in each of the four CCEs in each PRB pair takes two kinds of values (25 REs and 29 REs). More specifically, the number of REs included in CCEs #(4N) (that is, CCEs 0, 4, 8, 12) and CCEs #(4N+3) (that is, CCEs 3, 7, 11, 15) is 25, and the number of REs included in CCEs #(4N+1) (that is, CCEs 1, 5, 9, 13) and CCEs #(4N+2) (that is, CCEs 2, 6, 10, 14) is 29, where N is 0, 1, 2, or 3.

In addition, in the following description, it is assumed that the number of mapping candidates for aggregation levels 1, 2, 4, and 8 is 4, 4, 4, and 2, respectively. That is, at aggregation level 1, four CCEs from among CCE 0 to CCE 15 are configured as mapping candidates, respectively. Further, at aggregation level 2, four mapping candidates in which two CCEs are combined from among CCE 0 to CCE 15 are configured. Similarly, at aggregation level 4, four mapping candidates in which four CCEs are combined from among CCE 0 to CCE 15 are configured, and at aggregation level 8, two mapping candidates in which eight CCEs are combined from among CCE 0 to CCE 15 are configured.

Note that, when mapping candidates for each aggregation level are indicated one by one from base station 100 to terminal 200, the number of bits required for indication increases. Therefore, a preset of mapping candidates may be configured in advance. This preset corresponds to a VRB in as an R-PDCCH.

<Search Space Configuration Processing by Base Station 100>

In base station 100, search space configuration section 102 configures search spaces for each terminal 200 so that the numbers of REs included in CCEs forming search spaces configured for each terminal 200 become equal between terminals 200. Hereunder, a method of configuring search spaces for each aggregation level is described.

(Aggregation Level 1)

Search space configuration section 102 configures CCEs in which the numbers of REs are different as a plurality of (in this case, four) mapping candidates. More specifically, as four mapping candidates configured for one terminal 200, search space configuration section 102 selects CCEs from among CCE 0 to CCE 15 in such a way that the CCEs include both CCEs in which the number of REs is 25 (CCE #(4N) and CCE #(4N+3)) and CCEs in which the number of REs is 29 (CCE #(4N+1) and CCE #(4N+2)).

For example, with respect to one terminal 200, search space configuration section 102 selects one CCE each from the four kinds of CCEs, namely, CCE #(4N), CCE #(4N+1), CCE #(4N+2), and CCE #(4N+3), respectively, and configures the respective CCEs as four mapping candidates that correspond to aggregation level 1. In this case, the four mapping candidates are formed by 25 REs, 29 REs, 29 REs, and 25 REs, respectively. That is, in the search space, CCEs in which the numbers of REs are different from each other are included in CCEs that form a plurality of (four) mapping candidates, respectively.

(Aggregation Level 2)

Search space configuration section 102 configures a search space so that the total numbers of REs included in the CCEs forming the mapping candidates (that is, the total number of REs of two CCEs) become equal between the mapping candidates. In other words, search space configuration section 102 configures a search space so that, among a plurality of (four) mapping candidates forming the search space, a difference between the total numbers of REs included in the CCEs forming the mapping candidates (that is, the total number of REs of two CCEs) is minimized. More specifically, search space configuration section 102 selects two CCEs that include one set of the CCEs in which the number of REs is 25 (CCE #(4N) and CCE #(4N+3)) and the CCEs in which the number of REs is 29 (CCE #(4N+1) and CCE #(4N+2)) from among CCE 0 to CCE 15, and configures the selected CCEs as one mapping candidate.

For example, search space configuration section 102 configures CCE #(4N) (number of REs: 25) and CCE #(4N+2) (number of REs: 29) as a pair as a single mapping candidate, and configures CCE #(4N+1) (number of REs: 29) and CCE #(4N+3) (number of REs: 25) as a pair as a single mapping candidate. In this case, the number of REs of each of the four mapping candidates is 54 (=29+25).

(Aggregation Level 4)

Similarly to the case of aggregation level 2, search space configuration section 102 configures a search space so that among a plurality of (four) mapping candidates forming the search space, a difference between the total numbers of REs included in the CCEs forming the mapping candidates (that is, the total numbers of REs of four CCEs) is minimized. More specifically, search space configuration section 102 selects four CCEs that include the same number of CCEs in which the number of REs is 25 (CCE #(4N) and CCE #(4N+3)) and CCEs in which the number of REs is 29 (CCE #(4N+1) and CCE #(4N+2)) from among CCE 0 to CCE 15, and configures the selected CCEs as one mapping candidate.

For example, search space configuration section 102 selects pairs of four CCEs that include one set of CCE #(4N) and CCE #(4N+3) in which the number of REs is 25 and CCE #(4N+1) and CCE #(4N+2) in which the number of REs is 29 from among CCE 0 to CCE 15 and configures the selected CCEs as mapping candidates. That is, each of the mapping candidates includes one set of four kinds of CCEs obtained by dividing each PRB pair into four parts. In this case, the mapping candidates are formed by 108 (=25+29+29+25) REs.

(Aggregation Level 8)

Similarly to the case of aggregation levels 2 and 4, search space configuration section 102 configures a search space so that among a plurality of (two) mapping candidates forming the search space, a difference between the total numbers of REs included in the CCEs forming the mapping candidates (that is, the total numbers of REs of eight CCEs) is minimized. More specifically, search space configuration section 102 selects eight CCEs that include the same number of CCEs in which the number of REs is 25 (CCE #(4N) and CCE #(4N+3)) and CCEs in which the number of REs is 29 (CCE #(4N+1) and CCE #(4N+2)) from among CCE 0 to CCE 15, and configures the selected CCEs as one mapping candidate.

For example, search space configuration section 102 selects eight CCEs that include two sets of CCE #(4N) and CCE #(4N+3) in which the number of REs is 25 and CCE #(4N+1) and CCE #(4N+2) in which the number of REs is 29 from among CCE 0 to CCE 15 and configures the selected CCEs as a mapping candidate. That is, each of the mapping candidates includes two sets of four kinds of CCEs obtained by dividing each PRB pair into four parts. In this case, each of the mapping candidates is formed by 216 (=(25+29+29+25)×2) REs.

By performing the above described processing, search space configuration section 102 configures search spaces for terminal 200. Note that search space configuration section 102 performs the above described search space configuration for each terminal 200.

Here, as "an unequal configuration of search spaces (number of REs) between terminals 200", for example, a case may be mentioned in which in a certain terminal 200 the mapping candidates are formed by only CCEs (CCE #(4N) and CCE #(4N+3)) in which the number of REs is 25, and in another terminal 200 the mapping candidates are formed by only CCEs (CCE #(4N+1) and CCE #(4N+2)) in which the number of REs is 29. When comparing a case where an ePDCCH (control information) is allocated using only mapping candidates formed by only CCEs in which the number of REs is 25 and a case where an ePDCCH (control information) is allocated using only mapping candidates formed by only CCEs in which the number of REs is 29, although the channel quality between base station 100 and terminal 200 may be the same in both cases, an inequality arises in the reception quality at the respective terminals 200. In particular, at aggregation level 1, since the number of REs per mapping candidate is small compared to the other aggregation levels, a situation should be avoided in which, among CCEs that include a different number of REs from each other, only CCEs having a small number of REs are configured unequally in one terminal 200.

In this regard, according to the present embodiment, the number of REs that can be used for an ePDCCH can be equalized among terminals 200 at aggregation levels 1, 2, 4, and 8. That is, at aggregation levels, a difference in the number of REs that can be used for an ePDCCH is eliminated between terminals 200. Therefore, base station 100 can equally configure the number of REs that can be used for an ePDCCH for each terminal 200, and inequalities in the numbers of REs (inequality in the reception quality) that can be used for an ePDCCH between terminals 200 are moderated.

In addition, according to the present embodiment, at each of aggregation levels 2, 4, and 8, since a difference in the number of REs between the mapping candidates is minimized (in this case, the difference is eliminated), the number of REs that can be used for an ePDCCH can be equalized among the mapping candidates. That is, differences in the reception quality of terminals 200 that are attributable to the numbers of REs can be equalized among the mapping candidates. That is, inequalities in the numbers of REs (difference in the reception quality) are moderated by the selection of the mapping candidates to which the control information is mapped.

Next, examples of configuring search spaces by performing the above described search space configuration processing is described. Hereunder, search space configuration examples 1 to 4 are described.

Configuration Example 1

FIG. 9 illustrates an example of configuring search spaces according to configuration example 1. The search spaces shown in FIG. 9 are configured for a single terminal 200, and search spaces different from the search spaces shown in FIG. 9 are configured for terminals 200 other than terminal 200 corresponding to FIG. 9.

As shown in FIG. 9, for aggregation level 1, CCE 0, CCE 5, CCE 10 and CCE 15 are configured as one mapping candidate. That is, for aggregation level 1, CCE #(4N), CCE #(4N+1), CCE #(4N+2) and CCE #(4N+3) are each configured as a single mapping candidate.

Further, as shown in FIG. 9, for aggregation level 2, a pair of CCE 1 and CCE 3, a pair of CCE 4 and CCE 14, a pair of CCE 9 and CCE 3, and a pair of CCE 12 and CCE 14 are each configured as a single mapping candidate. That is, for aggregation level 2, a pair of CCE #(4N) and CCE #(4N+2) or a pair of CCE #(4N+1) and CCE #(4N+3) is configured as one mapping candidate.

Further, as shown in FIG. 9, for aggregation level 4, a combination of CCE 2, CCE 7, CCE 8 and CCE 13, a combination of CCE 1, CCE 6, CCE 11 and CCE 12, a combination of CCE 0, CCE 1, CCE 2 and CCE 3, and a combination of CCE 8, CCE 9, CCE 10 and CCE 11 are each configured as one mapping candidate. That is, at aggregation level 4, a single mapping candidate includes one set of CCE #(4N), CCE #(4N+1), CCE #(4N+2) and CCE #(4N+3).

In addition, as shown in FIG. 9, for aggregation level 8, a combination of CCE 1, CCE 3, CCE 4, CCE 6, CCE 9, CCE 11, CCE 1 and CCE 14 and a combination of CCE 0, CCE 1, CCE 2, CCE 3, CCE 4, CCE 5, CCE 6 and CCE 7 are each configured as one mapping candidate. That is, at aggregation level 8, a single mapping candidate includes two sets of CCE #(4N), CCE #(4N+1), CCE #(4N+2) and CCE #(4N+3).

Configuration Example 2

Figure 10:
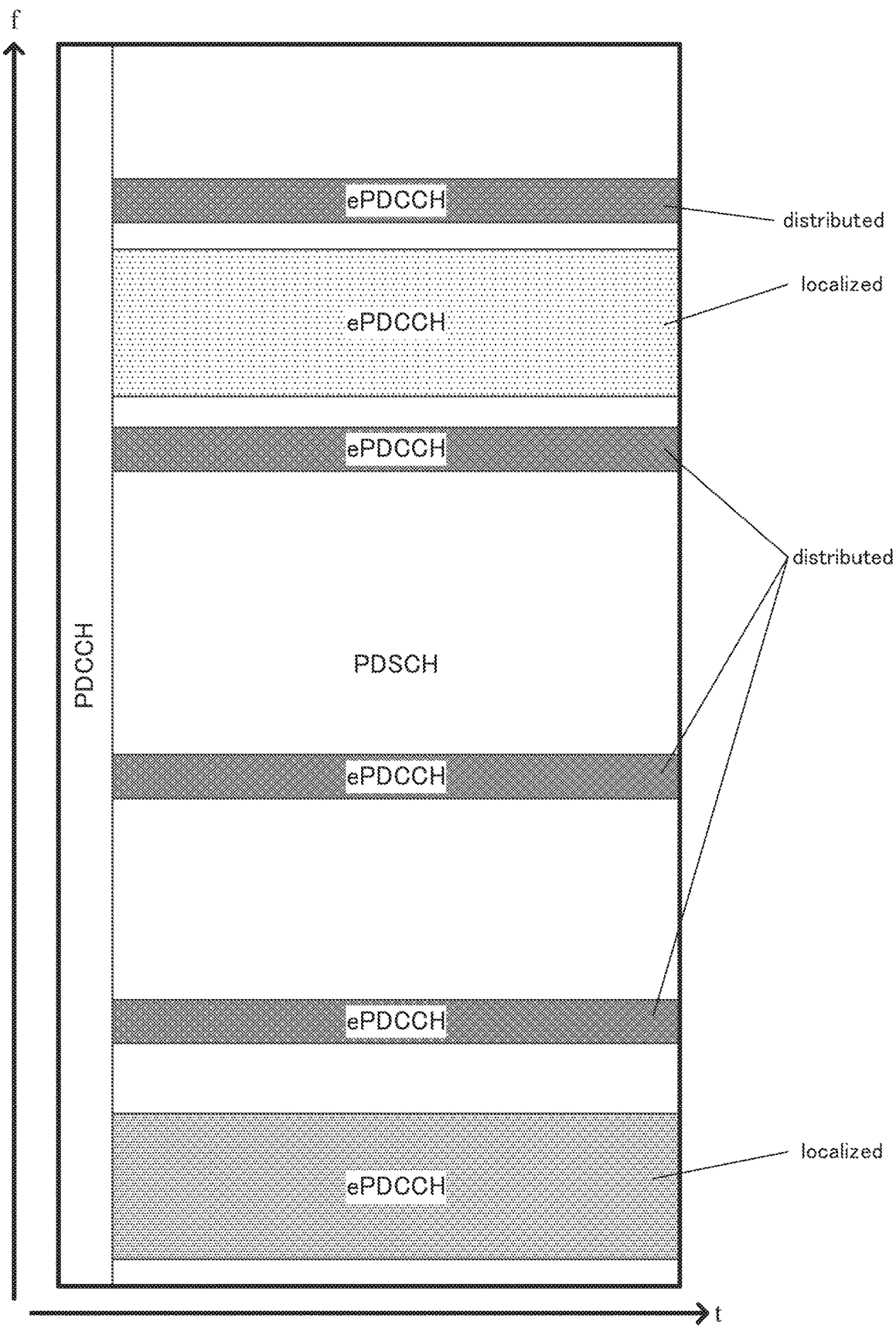
FIG. 10 illustrates an example of localized allocation and distributed allocation of ePDCCHs.

"Localized allocation" which allocates ePDCCHs collectively at positions close to each other on the frequency band, and "distributed allocation" which allocates ePDCCHs by distributing the ePDCCHs on the frequency band are being studied as allocation methods for ePDCCHs (for example, see FIG. 10). Localized allocation is an allocation method for obtaining a frequency scheduling gain, and can be used to allocate ePDCCHs to resources that have favorable channel quality based on channel quality information. Distributed allocation distributes ePDCCHs on the frequency axis, and can obtain a frequency diversity gain. In the LTE-Advanced system, both a search space for localized allocation and a search space for distributed allocation may be configured (for example, see FIG. 10).

Therefore, according to configuration example 2, a case is described in which a search space for localized allocation is configured for aggregation level 2 (aggregation level 1), search spaces for both localized allocation and distributed allocation are configured for aggregation level 4, and a search space for distributed allocation is configured for aggregation level 8.

FIG. 11 illustrates an example of configuring search spaces according to configuration example 2. The search spaces shown in FIG. 11 are configured for a single terminal 200, and search spaces different from the search spaces shown in FIG. 11 are configured for terminals 200 other than terminal 200 corresponding to FIG. 11. Note that since the combinations of CCE #(4N), CCE #(4N+1), CCE #(4N+2) and CCE #(4N+3) in each aggregation level are the same as in mapping example 1 (FIG. 9), a description thereof is omitted here.

As shown in FIG. 11, for aggregation level 2 (aggregation level 1), four mapping candidates are configured so as to be a localized allocation. For example, in FIG. 11, CCE 1 and CCE 3 forming one mapping candidate are both included in PRB pair #A shown in FIG. 3. Likewise, in FIG. 11, CCE 4 and CCE 6 forming one mapping candidate are both included in PRB pair #B shown in FIG. 3. The same situation also applies with respect to the other mapping candidates. That is, one mapping candidate includes only CCEs that are in the same PRB pair.

Further, as shown in FIG. 11, for aggregation level 4, two mapping candidates are configured so as to be a distributed allocation, and the remaining two mapping candidates are configured so as to be a localized allocation. For example, in FIG. 11, CCE 2, CCE 7, CCE 8 and CCE 13 forming one mapping candidate are CCEs that are distributed between the PRB pair #A to PRB pair #D shown in FIG. 3. The situation is also the same for the mapping candidate formed by CCE 1, CCE 6, CCE 11 and CCE 12 shown in FIG. 11. On the other hand, in FIG. 11, CCE 0, CCE 1, CCE 2 and CCE 3 forming one mapping candidate are CCEs that are included in PRB pair #A shown in FIG. 3. The situation is also the same for the mapping candidate formed by CCE 8, CCE 9, CCE 10 and CCE 11 shown in FIG. 11. That is, among the four mapping candidates, two mapping candidates include one set of four kinds of CCEs (CCE #(4N), CCE #(4N+1), CCE #(4N+2) and CCE #(4N+3)) obtained by dividing the same PRB pair into four parts, and the remaining two mapping candidates include one each of the above described four kinds of CCEs of different PRB pairs.

In addition, as shown in FIG. 11, for aggregation level 8, two mapping candidates are configured so as to be a distributed allocation. For example, in FIG. 11, CCE 1, CCE 3, CCE 4, CCE 6, CCE 9, CCE 11, CCE 12 and CCE 14 forming one mapping candidate are CCEs that are distributed between PRB pair #A to PRB pair #D shown in FIG. 3. The situation is also the same for the mapping candidate formed by CCE 0, CCE 2, CCE 5, CCE 7, CCE 8, CCE 10, CCE 13 and CCE 15 shown in FIG. 11. That is, one mapping candidate includes CCEs that are in a plurality of PRB pairs.

Here, with respect to a localized allocation, even when base station 100 selects a PRB pair for which the channel quality is favorable as a resource to be used for ePDCCHs, when there is a difference between the numbers of REs in the CCEs in the relevant PRB pair, if a mapping candidate formed by a CCE having a small number of REs is selected, the reception quality will deteriorate and it will be difficult to obtain a frequency scheduling gain.

In this respect, according to mapping example 2, similarly to mapping example 1, the numbers of REs are equalized among the mapping candidates (a difference between the numbers of REs is minimized). Hence, for example, with respect to aggregation levels 2 and 4, when base station 100 selects a mapping candidate that corresponds to localized allocation, regardless of which mapping candidate in a PRB pair for which the channel quality is favorable is selected, equivalent frequency scheduling effects can be obtained.

A general solution with respect to the search space configuration shown in FIG. 11 is illustrated in FIG. 12. In FIG. 12, L represents a value that identifies terminal 200. For example, L is a CRNTI number that identifies terminal 200 that is allocated to the relevant terminal 200 from base station 100. L is a value that is shared between base station 100 and terminal 200. Further, in FIG. 12, a function (X mod 4) represents a remainder when X is divided by 4.

Thus, search space configuration section 102 configures different search spaces for each terminal 200 by calculating CCEs based on the value of L allocated to each terminal 200, respectively, and the calculation formulas shown in FIG. 12. As shown in FIG. 12, in the case of aggregation level 1, combinations of four patterns exist depending on the value of L. Further, for example, with respect to terminals 200 for which L=0, 4, 8, ... (multiples of 4) are configured in FIG. 12, the search spaces that search space configuration section 102 configures are the same as in FIG. 11.

Note that, in mapping example 2, CCEs are selected from the same PRB pair for localized allocation, and CCEs are selected from a plurality of PRB pairs for distributed allocation. However, CCEs that are selected for localized allocation need not only be CCEs that are selected from the same PRB pair, and may be CCEs included in PRB pairs having PRB numbers that are close to each other or CCEs included in PRB pairs in RBGs (RB groups) having RBG numbers that are close to each other.

Configuration Example 3

Configuration example 3 describes configuration with respect to a subframe in which CSI-RSs are mapped.

Figures 13A, 13B:
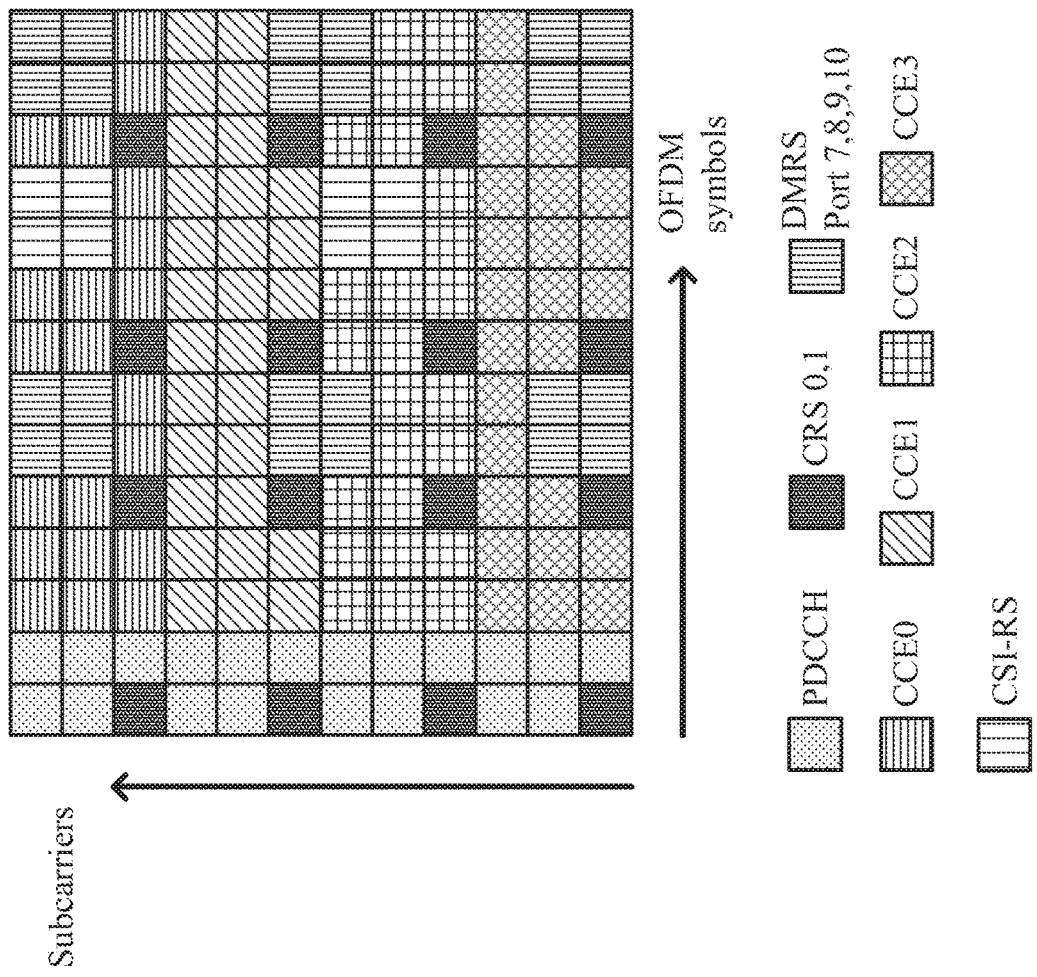
FIGS. 13A and 13B are diagrams provided for describing a PRB pair according to Embodiment 1 of the present invention (configuration example 3)

FIG. 13A illustrates an example in which, similarly to FIG. 3, one PRB pair is divided in subcarrier units into four CCEs (CCE #(4N), CCE #(4N+1), CCE #(4N+2), CCE #(4N+3)). However, in FIG. 13A, in addition to REs in which CRSs and DMRSs are mapped similarly to FIG. 3, REs in which CSI-RSs are mapped can also not be used for ePDCCHs. That is, in FIG. 13A, the number of REs that can be used for ePDCCHs is less than in FIG. 3. More specifically, among the REs (144 REs) forming OFDM symbols to be used for ePDCCHs, the number of REs that can be used for ePDCCHs is 100 REs.

As shown in FIG. 13B, the number of REs forming each CCE is 21 REs in CCE #(4N), 29 REs in CCE #(4N+1), 25 REs in CCE #(4N+2), and 25 REs in CCE #(4N+3). That is, compared to FIG. 4, in FIG. 13B, in CCE #(4N) and CCE #(4N+2) the number of REs used for ePDCCHs is decreased by 4 REs which corresponds to the number of REs in which CSI-RSs are mapped. Further, with respect to the numbers of REs included in each of the four CCEs in each PRB pair, although in FIG. 4 the numbers of REs take two kinds of values (25 REs and 29 REs), in FIG. 13B the numbers of REs take three kinds of values (21 REs, 25 REs, and 29 REs), and hence an inequality in the numbers of REs forming the CCEs in one PRB pair is even more noticeable.

In configuration example 3, in the case of aggregation level 2 (one mapping candidate: 2 CCEs), search space configuration section 102 configures at least one mapping candidate that includes a pair of CCEs formed by a CCE with the largest number of REs and a CCE with the smallest number of REs. For example, in FIG. 13B, search space configuration section 102 configures a pair formed by CCE #(4N) in which the number of REs is the smallest number of 21 REs and CCE #(4N+1) in which the number of REs is the largest number of 29 REs as one mapping candidate.

Further, in the case of aggregation level 2 (one mapping candidate: 2 CCEs), search space configuration section 102 configures at least one mapping candidate that includes CCEs in which the number of REs is different from the pair that includes the CCE with the largest number of REs and the CCE with the smallest number of REs. For example, in FIG. 13B, search space configuration section 102 configures a pair formed by CCE #(4N+2) and CCE #(4N+3) in which the number of REs is 25, as one mapping candidate.

Thus, the mapping candidate including CCE #(4N) and CCE #(4N+1) is formed by 50 (=21+29) REs, and the mapping candidate including CCE #(4N+2) and CCE #(4N+3) is formed by 50 (=25+25) REs. That is, since a difference in the number of REs between mapping candidates is minimized (in this case, the difference is eliminated), the number of REs that can be used for ePDCCHs can be equalized between mapping candidates. That is, differences in the reception quality at terminals 200 that are attributable to the numbers of REs can be equalized among the mapping candidates.

Note that, in the case of aggregation levels 1, 4, and 8, the situation is the same as in configuration examples 1 or 2.

Configuration Example 4

According to mapping example 4, a case is described in which one REG (resource element group) is formed by two REs, and one CCE is formed by M*2 REs (M is an arbitrary natural number).

Further, in mapping example 4, REGs belonging to each CCE (four CCEs in this case) are interleaved and mapped in PRB pairs.

Figures 14A, 14B:
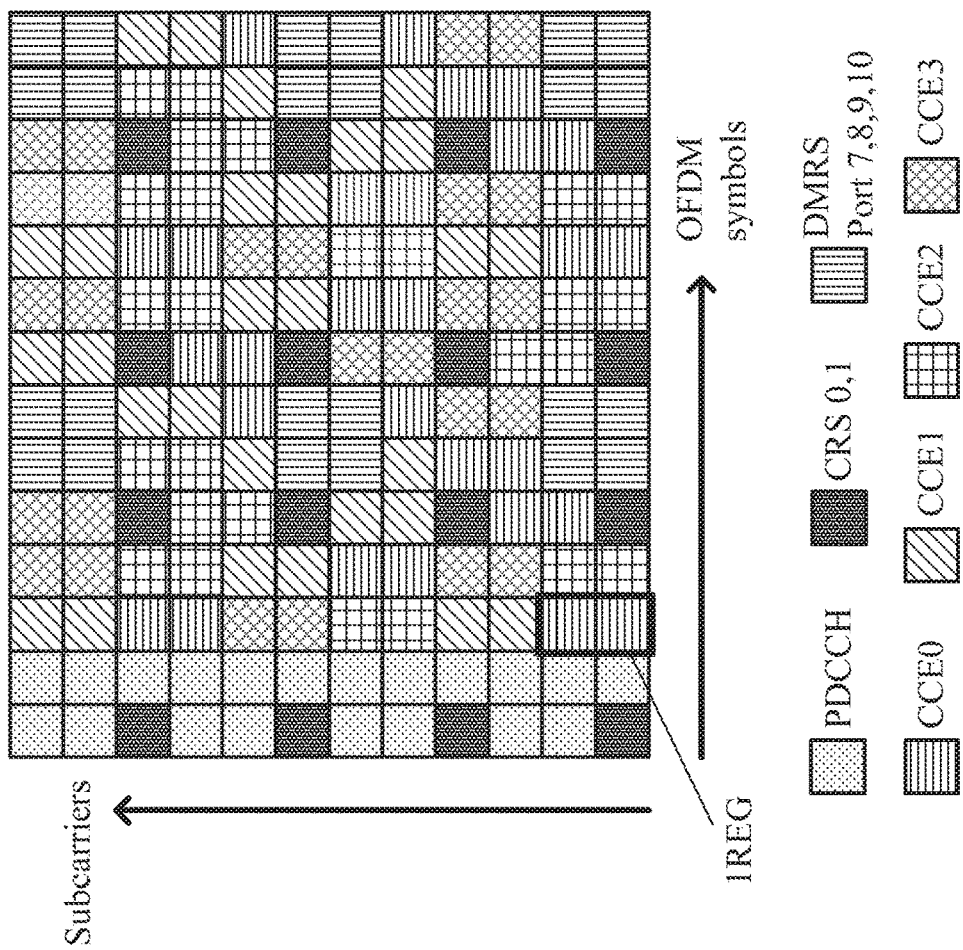
FIGS. 14A and 14B are diagrams provided for describing a PRB pair according to Embodiment 1 of the present invention (configuration example 4)

For example, in FIG. 14A, among the REs that can be used for ePDCCHs, the REGs (2 REs) belonging to each CCE are disposed in ascending order of the subcarrier numbers from the position of a smallest subcarrier number (REG surrounded by a thick line in FIG. 14A) that is the smallest OFDM symbol number, and when REGs are disposed in the positions of all the subcarrier numbers for the relevant OFDM symbol number, REGs are then disposed in ascending order of the subcarrier numbers at the next OFDM number. In FIG. 14A, REGs are disposed in the order of CCE 0 (CCE #(4N)), CCE 1 (CCE #(4N+1)), CCE 2 (CCE #(4N+2)) and CCE 3 (CCE #(4N+3)). The above described disposing of REGs is performed up to the largest OFDM symbol number (in FIG. 14A, the 15th OFDM symbol). As a result, as shown in FIG. 14B, the number of REs forming each of the CCEs is 28 REs in CCE #(4N), 28 REs in CCE #(4N+1), 26 REs in CCE #(4N+2), and 26 REs in CCE #(4N+3).

In addition, in FIG. 14A, since REGs are allocated in the order of CCE #(4N), CCE #(4N+1), CCE #(4N+2) and CCE #(4N+3), the relationship in the following expression 1 is established with respect to the number of REs of each CCE.

[1]

Number of REs of CCE #(4*N*)≥number of REs of CCE #(4*N*+1)≥number of REs of CCE #(4*N*+2) ≥number of REs of CCE #(4*N*+3)  (Expression 1)

Search space configuration section 102 configures a search space so that a difference between the total numbers of REs among mapping candidates is minimized. In particular, in the case of aggregation level 2 when the condition of expression 1 is satisfied, search space configuration section 102 configures two CCEs including one set of CCE #(4N) and CCE #(4N+3), and two CCEs including one set of CCE #(4N+1) and CCE #(4N+2) as mapping candidates. Thus, as shown in FIG. 14B, the number of REs forming the mapping candidate including CCE #(4N) and CCE #(4N+3) and the number of REs forming the mapping candidate including CCE #(4N+1) and CCE #(4N+2) are both 54 (=28+26), and therefore match. That is, since a difference in the number of REs between the mapping candidates is minimized (in this case, the difference is eliminated), the number of REs that can be used for ePDCCHs can be equalized between the mapping candidates. That is, differences in the reception quality at terminals 200 that are attributable to the numbers of REs can be equalized among the mapping candidates.

Here, when the condition of expression 1 is satisfied, a difference in the number of REs between CCEs is, at most, 2 REs. For example, when the number of REs of CCE #(4N+3) (that is, the CCE that is last in the order of disposing the REGs) is taken as K, the numbers of REs of the CCEs take the values in cases 1 to 4 that are shown in FIG. 15A. As shown in FIG. 15A, the numbers of REs included in the respective four CCEs of one PRB pair take two kinds of values ((K+2) REs and K REs). For example, FIG. 14A corresponds to case 3 (K=26) shown in FIG. 15A.

Further, FIG. 15B shows total numbers of REs of mapping candidates (2 CCEs) when, with respect to each case shown in FIG. 15A, CCE #(4N) and CCE #(4N+3) are taken as a pair, and CCE #(4N+1) and CCE #(4N+2) are taken as a pair. As shown in FIG. 15B, it is found that a difference between the total numbers of REs between the above two kinds of mapping candidates is, at most, 2 REs.

FIG. 16 illustrates an example of configuring search spaces according to configuration example 4. The search spaces shown in FIG. 16 are configured for a single terminal 200, and search spaces that are different from the search spaces shown in FIG. 16 are configured for terminals 200 other than the terminal 200 corresponding to FIG. 16. Note that, the cases for aggregation levels 1, 4, and 8 are the same as in configuration examples 1, 2, or 3, and hence a description thereof is omitted here.

As shown in FIG. 16, for aggregation level 2, four mapping candidates are formed by any of a pair of CCE #(4N) and CCE #(4N+3) (CCE 4 and CCE 7, CCE 8 and CCE 11) and a pair of CCE #(4N+1) and CCE #(4N+2) (CCE 1 and CCE 2, CCE 13 and CCE 14).

A general solution for the search space configurations shown in FIG. 16 is illustrated in FIG. 17. In FIG. 17, L represents a value that identifies terminal 200. For example, L is a CRNTI number that identifies the target terminal 200. L is a value that is shared between base station 100 and terminal 200. Further, in FIG. 17, a function (X mod 4) represents a remainder when X is divided by 4. Expressions 2, 3 and 4 for calculating CCEs of a part of aggregation level 4 and aggregation level 8 shown in FIG. 17 are as follows.

[2]

CCE#*X*0=((CCE(*L*)mod 4)+((*L* mod 2)*2−1))mod 4

CCE#*X*1=((CCE(*L*+1)mod 4+4)+((*L*+1 mod 2)*2−1)) mod 4+4

CCE#*X*2=((CCE(*L*+2)mod 4+8)+((*L*+2 mod 2)*2−1)) mod 4+8

CCE#*X*3=((CCE(*L*+3)mod 4+12)+((*L*+3 mod 2)*2− 1))mod 4+12  (Expression 2)

[3]
Same as Aggregation Level 2

CCE#1,CCE#2 If (CCE(*L*)mod 4)mod 4=0 or 3

CCE#0,CCE#3 If (CCE(*L*)mod 4)mod 4=1 or 2

CCE#5,CCE#6 If (CCE(*L*+1)mod 4+4)mod 4=0 or 3

CCE#4,CCE#7 If (CCE(*L*+1)mod 4+4)mod 4=1 or 2

CCE#9,CCE#10 If (CCE(*L*+2)mod 4+8)mod 4=0 or 3

CCE#8,CCE#11 If (CCE(*L*+2)mod 4+8)mod 4=1 or 2

CCE#13,CCE#14 If (CCE(L+3)mod 4+12)mod 4=0 or 3

CCE#12,CCE#15 If (CCE(L+3)mod 4+12)mod 4=1 or 2    (Expression 3)

[4]
CCEs not Selected with Expression 3

CCE#0,CCE#3 If (CCE(L)mod 4)mod 4=0 or 3

CCE#1,CCE#2 If (CCE(L)mod 4)mod 4=1 or 2

CCE#4,CCE#7 If (CCE(L+1)mod 4+4)mod 4=0 or 3

CCE#5,CCE#6 If (CCE(L+1)mod 4+4)mod 4=1 or 2

CCE#8,CCE#11 If (CCE(L+2)mod 4+8)mod 4=0 or 3

CCE#9,CCE#10 If (CCE(L+2)mod 4+8)mod 4=1 or 2

CCE#12,CCE#15 If (CCE(L+3)mod 4+12)mod 4=0 or 3

CCE#13,CCE#14 If (CCE(L+3)mod 4+12)mod 4=1 or 2    (Expression 4)

Similarly to configuration example 2 (FIG. 12), search space configuration section 102 configures search spaces that differ for each terminal 200 by calculating CCEs based on the values of L that are assigned to each terminal 200, and the calculation formulas shown in FIG. 17. For example, with respect to terminals 200 for which L=0, 4, 8, . . . (multiples of 4) are configured in FIG. 17, the search spaces that search space configuration section 102 configures are the same as in FIG. 16.

As shown in FIG. 17, for aggregation level 2, pairs of CCEs that include CCEs that are not used in aggregation level 1 are selected. Further, in FIG. 17, mapping candidates corresponding to the second row from the top of aggregation level 4 are formed by the same four CCEs as the four mapping candidates of aggregation level 1.

In addition, mapping candidates (expression 2) corresponding to the first row from the top of aggregation level 4 are calculated based on the mapping candidates corresponding to the second row from the top of aggregation level 4.

Specifically, the CCEs of mapping candidates corresponding to the first row from the top of aggregation level 4 are calculated in the following manner based on the CCEs of the mapping candidates corresponding to the second row from the top of aggregation level 4. That is, if CCE #(4N) is adopted to form a mapping candidate corresponding to the aforementioned second row, then CCE #(4N+3) in the same PRB pair as the relevant CCE is adopted as a CCE of a mapping candidate corresponding to the aforementioned first row, and likewise, if CCE #(4N+3) is adopted in the second row, then CCE #(4N) in the same PRB pair as the relevant CCE is adopted in the first row, if CCE #(4N+1) is adopted in the second row, then CCE #(4N+2) in the same PRB pair as the relevant CCE is adopted in the first row, and if CCE #(4N+2) is adopted in the second row, then CCE #(4N+1) in the same PRB pair as the relevant CCE is adopted in the first row. That is, the calculation formula illustrated in expression 2 represents processing that shifts the CCEs of the mapping candidates of the aforementioned second row to calculate the CCEs of the mapping candidates of the aforementioned first row. More specifically, ((L mod 2)*2−1) in Expression (2) corresponds to the above described shift processing. ((L mod 2)*2−1) is "+1" when L is an odd number, and is "−1" when L is an even number.

The foregoing describes search space configuration examples 1 to 4.

<Search Space Configuration Processing by Terminal 200>

In terminal 200, similarly to search space configuration section 102, search space configuration section 205 configures a configured search space for its own device. As a result, candidates as resources in which control information intended for the relevant terminal 200 is mapped are determined.

As described above, according to the present embodiment, base station 100 (search space configuration section 102) and terminal 200 (search space configuration section 205) configure search spaces formed by a plurality of mapping candidates based on an aggregation level value. Each mapping candidate is formed by the same number of CCEs as the aggregation level value, and the CCEs are obtained by dividing each PRB pair into a predetermined number of parts. Further, the number of REs included in each of a predetermined number of CCEs in each PRB pair takes at least two kinds of values. In this case, for each search space for which the aggregation level value is two or more, base station 100 and terminal 200 configure the search space so that, among a plurality of mapping candidates, a difference between the total numbers of REs included in CCEs forming the mapping candidates is minimized.

In addition, for a search space for which the aggregation level value is one, base station 100 and terminal 200 configure the relevant search space so that CCEs in which the numbers of REs are different from each other are included in CCEs forming each of a plurality of mapping candidates.

Thus, even if there is a difference in the number of REs included in the CCEs obtained by dividing each PRB pair, the resources that can be used for ePDCCHs can be equalized among terminals 200 and an inequality in the reception characteristics of control information can be reduced. Further, at aggregation level two or more, resources that can be used for ePDCCHs can also be equalized among a plurality of mapping candidates configured for one terminal 200, and an inequality in the reception characteristics of control information can be reduced.

Note that a value of L that is used in the present embodiment is not limited to a CRNTI, and may be another identification number that is shared between base station 100 and terminal 200. Further, as the value of L, an identification number may be used that is newly notified from base station 100 to terminal 200. Further, a value obtained by multiplying a plurality of identification numbers by each other may also be used as the value of L. For example, a value obtained by multiplying a CRNTI number and a cell ID by each other may be used as the value of L.

Embodiment 2

The present embodiment relates to a method of configuring a search space for a UL grant and a DL assignment. Note that a base station and a terminal according to the present embodiment share the same basic configurations as base station 100 and terminal 200 according to Embodiment 1. Accordingly, a description will be provided referring back to FIGS. 7 and 8.

In the present embodiment, as one example, a case is described in which each PRB pair is divided into four CCEs.

According to the localized allocation of aggregation levels 1 and 2, since it is desired to transmit control signals (UL grant and DL assignment) using PRB pairs for which the channel quality is favorable, there is a demand to assign a UL grant and a DL assignment to the same PRB pair for which the channel quality is favorable.

Therefore, according to the present embodiment, at base station 100, search space configuration section 102 configures each of a search space for a UL grant and a search space for a DL assignment in the same aggregation level. In addition, from the viewpoint of lowering the probability of collision (blocking), search space configuration section 102 configures a search space for a UL grant and a search space for a DL assignment, respectively, by means of mapping candidates that include CCEs that are different from each other. Furthermore, at aggregation levels 1 and 2 for which the value is less than the predetermined number of divisions (in this case, four), search space configuration section 102 configures a search space for a UL grant and a search space for a DL assignment, respectively, by means of mapping candidates including CCEs that are different from each other within the same PRB pair.

There is also the possibility of different aggregation levels being used as search spaces for a UL grant and a DL assignment.

In an ePDCCH, a UL grant and a DL assignment are indicated with DCI (downlink control information) that is control information for a downlink. There are a plurality of formats for the DCI. In particular, a case may be considered in which DCI format 0 is used for the UL grant, and among DCI formats that depend on the transmission mode, DCI format 2, DCI format 2A, DCI format 2B, DCI format 2C or the like that support MIMO transmission is used for the DL assignment. The format size (number of bits) of DCI format 2, DCI format 2A, DCI format 2B, and DCI format 2C is larger than the format size of DCI format 0. Hence, a search space for which an aggregation level value is larger than that of the UL grant is liable to be selected for the DL assignment. For example, in a case where DCI format 0 (number of bits: 43) is used for the UL grant, and DCI format 2C or DCI format 2B (number of bits: 58 or 57) is used for the DL assignment, a search space of aggregation level 1 is configured for the UL grant and a search space of aggregation level 2 is configured for the DL assignment.

Therefore, according to the present embodiment, in base station 100, search space configuration section 102 configures a search space for a DL assignment of aggregation level 2 and a search space for a UL grant of aggregation level 1 (aggregation level next to the aggregation level of the search space for the DL assignment) in the same PRB pair. At this time, from the viewpoint of lowering the probability of collision (blocking), the respective search spaces that are configured in the same PRB pair are formed by CCEs that are different from each other in the PRB pair.

Search space configuration examples according to the present embodiment are described below.

(Aggregation Levels 1 and 2)

Figure 18:
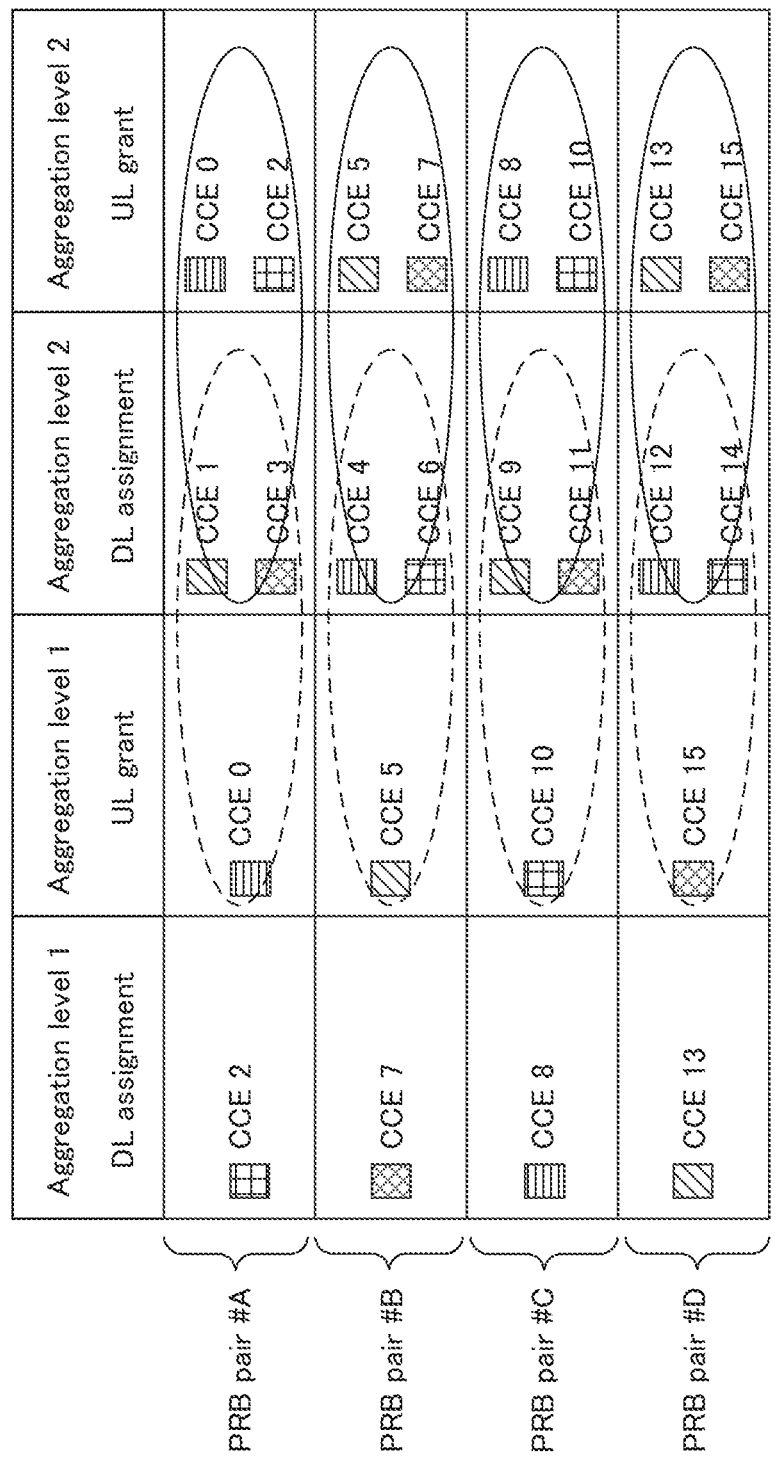
FIG. 18 illustrates a search space configuration example according to Embodiment 2 of the present invention.

FIG. 18 illustrates an example of configuring search spaces of aggregation levels 1 and 2 according to the present embodiment. In FIG. 18, the relationships between the PRB pairs and CCEs are the same as in FIG. 3.

As shown in FIG. 18, in a search space for a DL assignment of aggregation level 1, CCE 2, CCE 7, CCE 8 and CCE 13 are each configured as a single mapping candidate. Further, as shown in FIG. 18, in a search space for a UL grant of aggregation level 1, CCE 0, CCE 5, CCE 10 and CCE 15 are each configured as a single mapping candidate.

As shown in FIG. 18, in a search space for a DL assignment of aggregation level 2, a pair of CCE 1 and CCE 3, a pair of CCE 4 and CCE 6, a pair of CCE 9 and CCE 11, and a pair of CCE 12 and CCE 14 are each configured as a single mapping candidate. Further, as shown in FIG. 18, in a search space for a UL grant of aggregation level 2, a pair of CCE 0 and CCE 2, a pair of CCE 5 and CCE 7, a pair of CCE 8 and CCE 10, and a pair of CCE 13 and CCE 15 are each configured as a single mapping candidate.

Attention will now be focused on the search spaces of aggregation level 2 shown in FIG. 18 (portions surrounded by ovals formed by solid lines).

In FIG. 18, among the CCEs in PRB pair #A (CCE 0 to CCE 3) shown in FIG. 3, while CCE 1 and CCE 3 are mapping candidates for the DL assignment, the remaining CCE 0 and CCE 2 are mapping candidates for the UL grant. Likewise, in FIG. 18, among the CCEs in PRB pair #B (CCE 4 to CCE 7) shown in FIG. 3, while CCE 4 and CCE 6 are mapping candidates for the DL assignment, the remaining CCE 5 and CCE 7 are mapping candidates for the UL grant. A similar situation applies with respect to PRB pairs #C and #D.

Note that a similar situation also applies with respect to the search spaces of aggregation level 1. That is, in FIG. 18, among the CCEs in PRB pair #A (CCE 0 to CCE 3) shown in FIG. 3, while CCE 2 is a mapping candidate for a DL assignment, CCE 0 that is another CCE in PRB pair #A is a mapping candidate for a UL grant. Likewise, in FIG. 18, among the CCEs in PRB pair #B (CCE 4 to CCE 7) shown in FIG. 3, while CCE 7 is a mapping candidate for a DL assignment, CCE 5 that is another CCE in PRB pair #B is a mapping candidate for a UL grant. A similar situation applies with respect to PRB pairs #C and #D.

That is, in each of aggregation levels 1 and 2, a search space for a DL assignment and a search space for a UL grant are respectively formed by mapping candidates including mutually different CCEs in the same PRB pair. As a result, for example, with respect to aggregation level 2, if it is determined that the channel quality of PRB pair #A is favorable, base station 100 can locate the DL assignment in CCE 1 and CCE 3 and locate the UL grant in CCE 0 and CCE 2, to thereby transmit the UL grant and DL assignment simultaneously using PRB pair #A.

Next, attention will be focused on the search space for a UL grant of aggregation level 1 and the search space for a DL assignment of aggregation level 2 that are shown in FIG. 18 (portions surrounded by ovals formed by broken lines).

In FIG. 18, among the CCEs in PRB pair #A (CCE 0 to CCE 3) shown in FIG. 3, while CCE 1 and CCE 3 are mapping candidates for the DL assignment, CCE 0 that is another CCE in PRB pair #A is a mapping candidate for the UL grant. Likewise, in FIG. 18, among the CCEs in PRB pair #B (CCE 4 to CCE 7) shown in FIG. 3, while CCE 4 and CCE 6 are mapping candidates for the DL assignment, CCE 5 that is another CCE in PRB pair #B is a mapping candidate for the UL grant. A similar situation applies with respect to PRB pairs #C and #D.

That is, a search space for a DL assignment of aggregation level 2 and a search space for a UL grant of aggregation level 1 are respectively formed by mapping candidates including mutually different CCEs in the same PRB pair. As a result, for example, if it is determined that the channel quality of PRB pair #A is favorable, base station 100 can map the DL assignment in CCE 1 and CCE 3 and map the UL grant in CCE 0, and thereby transmit the UL grant and DL assignment simultaneously using PRB pair #A.

Thus, search space configuration section 102 configures a search space for a UL grant and a search space for a DL assignment in each of the aggregation levels. Further, search space configuration section 102 selects mutually different CCEs in the same PRB pair, and configures the CCEs as a mapping candidate of a search space for a UL grant and a mapping candidate of a search space for a DL assignment, respectively.

Thus, base station 100 can map a UL grant and a DL assignment in mapping candidates in the same PRB pair. That is, base station 100 can transmit a UL grant and a DL assignment simultaneously using the same PRB pair.

In addition, search space configuration section 102 configures a search space for a UL grant of aggregation level 1 and a search space for a DL assignment of aggregation level 2 in the same PRB pair. Search space configuration section 102 also selects mutually different CCEs in the same PRB pair, and configures the CCEs as a mapping candidate of a search space for a UL grant and a mapping candidate of a search space for a DL assignment, respectively.

Thus, even when the aggregation levels of a UL grant and a DL assignment are different in a localized allocation, base station 100 can map the UL grant and the DL assignment in mapping candidates in the same PRB pair.

(Aggregation Levels 4 and 8)

FIG. 19 illustrates an example of configuring search spaces of aggregation levels 4 and 8 according to the present embodiment. In FIG. 19, the relationships between the PRB pairs and CCEs are the same as in FIG. 3.

As shown in FIG. 19, in a search space for a DL assignment of aggregation level 4, a combination of CCE 0, CCE 5, CCE 10 and CCE 15, a combination of CCE 3, CCE 4, CCE 9 and CCE 14, a combination of CCE 4, CCE 5, CCE 6 and CCE 7, and a combination of CCE 12, CCE 13, CCE 14 and CCE 15 are each configured as a single mapping candidate. Further, as shown in FIG. 19, in a search space for a UL grant of aggregation level 4, a combination of CCE 2, CCE 7, CCE 8 and CCE 13, a combination of CCE 1, CCE 6, CCE 11 and CCE 12, a combination of CCE 0, CCE 1, CCE 2 and CCE 3, and a combination of CCE 8, CCE 9, CCE 10 and CCE 11 are each configured as a single mapping candidate.

In addition, as shown in FIG. 19, in a search space for a DL assignment/UL grant of aggregation level 8, a combination of CCE 1, CCE 3, CCE 4, CCE 6, CCE 9, CCE 11, CCE 12 and CCE 14 and a combination of CCE 0, CCE 2, CCE 5, CCE 7, CCE 8, CCE 10, CCE 13 and CCE 15 are each configured as a single mapping candidate.

As shown in FIG. 19, with respect to a distributed allocation also, to avoid collisions (blocking) between a DL assignment and a UL grant, search spaces formed by different CCEs are configured with respect to a DL assignment and a UL grant at the aggregation levels.

For example, with respect to the distributed allocations of aggregation level 4 shown in FIG. 19, while the CCEs that can be used in a search space for a DL assignment are (CCE 0, CCE 5, CCE 10, CCE 15) and (CCE 3, CCE 4, CCE 9, CCE 14), the CCEs that can be used in a search space for a UL grant are the remaining (CCE 2, CCE 7, CCE 8, CCE 13) and (CCE 1, CCE 6, CCE 11, CCE 12). Further, with respect to aggregation level 8 (distributed allocation only) shown in FIG. 19, although the search space for a DL assignment and the search space for a UL grant are the same, the CCEs that constitute two mapping candidates are different from each other.

It is thereby possible for base station 100 to allocate a DL assignment and a UL grant at the same time.

Further, between the search space for a UL grant of aggregation level 4 and the search space of aggregation level 8 that are shown in FIG. 19, combinations also exist that enable base station 100 to simultaneously assign a DL assignment and a UL grant.

More specifically, a mapping candidate for a UL grant of aggregation level 4 (CCE 2, CCE 7, CCE 8, CCE 13) and a mapping candidate of aggregation level 8 (CCE 1, CCE 3, CCE 4, CCE 6, CCE 9, CCE 11, CCE 12, CCE 14) that are shown in FIG. 19 are formed by mutually different CCEs. Hence, base station 100 can allocate these mapping candidates to a DL assignment and a UL grant simultaneously. The same also applies with respect to a mapping candidate for a UL grant of aggregation level 4 (CCE 1, CCE 6, CCE 11, CCE 12) and a mapping candidate of aggregation level 8 (CCE 0, CCE 2, CCE 5, CCE 7, CCE 8, CCE 10, CCE 13, CCE 15) that are shown in FIG. 19.

Further, with respect to the localized allocations of aggregation level 4 shown in FIG. 19, while the CCEs that can be used in a search space for a DL assignment are (CCE 4, CCE 5, CCE 6, CCE 7) and (CCE 12, CCE 13, CCE 14, CCE 15), the CCEs that can be used in a search space for a UL grant are the remaining (CCE 0, CCE 1, CCE 2, CCE 3) and (CCE 8, CCE 9, CCE 10, CCE 11). That is, although PRB pairs that are different from each other are mapped in the respective mapping candidates, adjacent PRB pairs are mapped in a mapping candidate for a DL assignment and a mapping candidate for a UL grant. It is thereby possible for base station 100 to simultaneously assign a DL assignment and a UL grant using adjacent PRB pairs.

Note that, in terminal 200 also, search space configuration section 205 performs similar processing to search space configuration section 102 of base station 100.

According to the present embodiment configured as described above, since base station 100 can transmit a UL grant and a DL assignment simultaneously using the same PRB pair in accordance with the channel quality of each PRB pair, a frequency scheduling gain can be obtained. Further, according to the present embodiment, similarly to Embodiment 1, even when there is an inequality in the number of REs included in CCEs that are obtained by dividing within each PRB pair, resources that can be used for ePDCCHs can be equalized among terminals 200 and an inequality in the reception characteristics of control information can be decreased.

Note that DCI format 0 (for UL grants) and DCI format 1A (for DL grants) are the same size and can be subjected to blind decoding at the same time. Therefore, in the present embodiment, base station 100 may configure a search space for DCI format 4, DCI format 0, or DCI format 1A as a search space for a UL grant, and configure a search space for a DCI format for a DL that is determined according to the transmission mode as a search space for a DL grant. Since DCI format 1A is used in a case where communication cannot be performed using a DCI format with a large number of bits such as a DCI format for a DL that is determined according to the transmission mode and the like, the usage frequency of DCI format 1A is low. Accordingly, a search space of DCI format 1A is configured to the same search space as a UL grant (DCI format 0), and there is no significant problem even if a UL grant and a DL assignment can not be transmitted at the same time using the same PRB pair. Furthermore, whether or not DCI format 4 is used varies depending on the transmission mode of the UL, and hence a configuration may be adopted in which terminal 200 performs blind decoding only in a case where DCI format 4 is used.

In addition, in the present embodiment, if the number of REs of a CCE is too small for transmitting a signal in DCI format for a DL, for example, a configuration is conceivable in which the search space (group of mapping candidates) of aggregation level 1 for a DL assignment shown in FIG. 18 is not configured.

Embodiment 3

In Embodiments 1 and 2 a case was described in which each PRB pair is divided into four CCEs. In contrast, the present embodiment describes a case in which each PRB pair is divided into three CCEs. Note that a base station and a terminal according to the present embodiment share the same basic configurations as base station 100 and terminal 200 according to Embodiment 1 and Embodiment 2. Accordingly, a description will be provided referring back to FIGS. 7 and 8.

Similarly to Embodiments 1 and 2, search space configuration section 102 of base station 100 configures search spaces so that the numbers of REs in CCEs forming search spaces that are configured for each terminal 200 are equal among terminals 200. More specifically, search space configuration section 102 configures search spaces corresponding to aggregation levels 1, 2, 4, and 8 in the following manner.

Figures 20A, 20B:
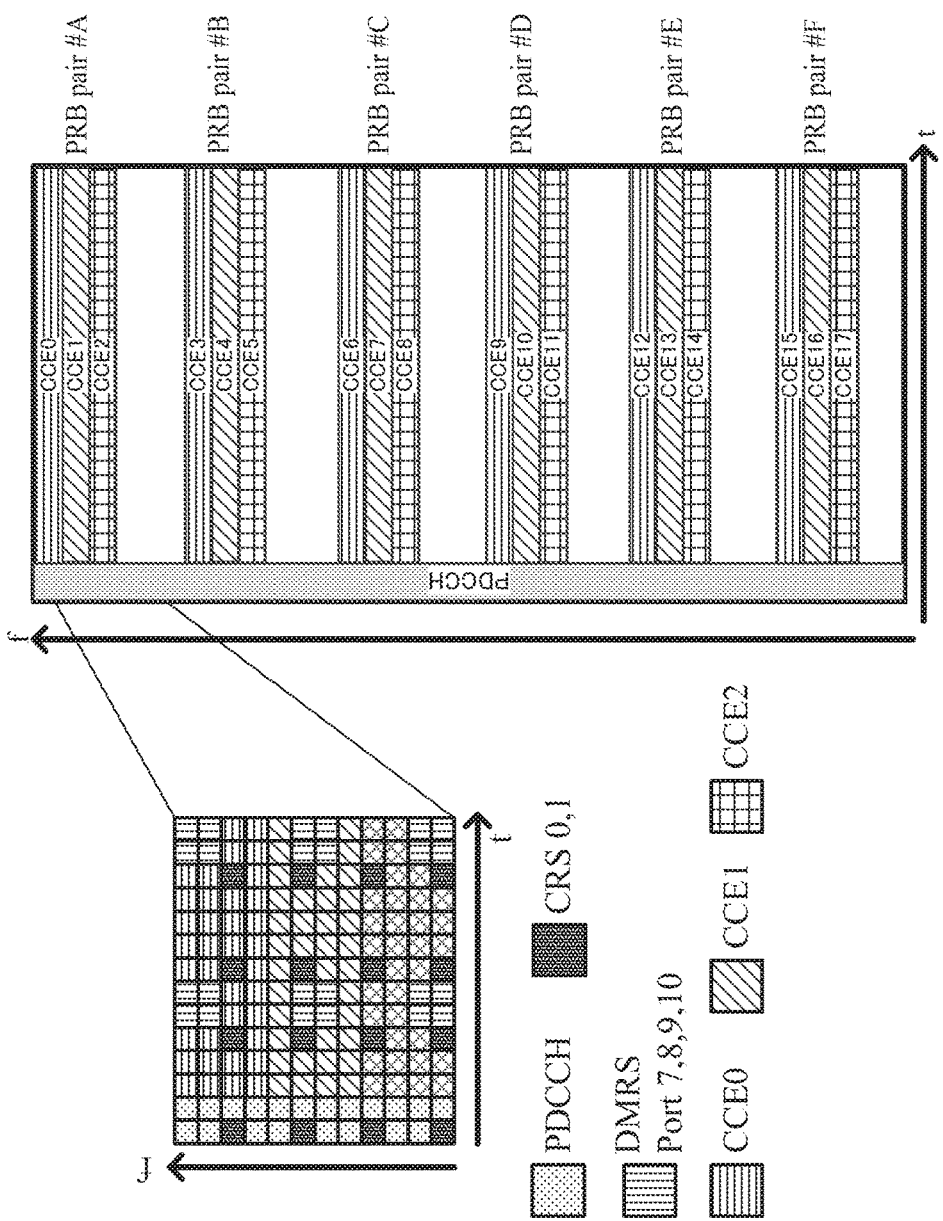
FIGS. 20A and 20B illustrate a mapping example of CCEs according to Embodiment 3 of the present invention.

In the following description, as one example, as shown in FIG. 20A, PRB pairs #A to #F are configured as resources that can be used for ePDCCHs. Further, as shown in FIG. 20A, each PRB pair is divided into three CCEs. More specifically, PRB pair #A includes CCE 0 to CCE 2, PRB pair #B includes CCE 3 to CCE 5, PRB pair #C includes CCE 6 to CCE 8, PRB pair #D includes CCE 9 to CCE 11, PRB pair #E includes CCE 12 to CCE 14, and PRB pair #F includes CCE 15 to CCE 17.

As shown in FIG. 20B, the numbers of REs included in the three CCEs inside each PRB pair take two kinds of values (37 REs and 34 REs), respectively. More specifically, the number of REs included in CCEs #(3N) (that is, CCEs 0, 3, 6, 9, 12, 15) and CCE #(3N+1) (that is, CCEs 1, 4, 7, 10, 13, 16) is 37, and the number of REs included in CCE #(3N+2) (that is, CCEs 2, 5, 8, 11, 14, 17) is 34, where N is 0, 1, 2, 3, 4 or 5.

In the following description, it is assumed that the number of mapping candidates for aggregation levels 1, 2, 4, and 8 is 6, 6, 2, and 2, respectively. That is, at aggregation level 1, six CCEs from among CCE 0 to CCE 17 are configured as mapping candidates, respectively. Further, at aggregation level 2, six mapping candidates in which two CCEs are combined from among CCE 0 to CCE 17 are configured. Similarly, at aggregation level 4, two mapping candidates in which four CCEs are combined from among CCE 0 to CCE 17 are configured, and at aggregation level 8, two mapping candidates in which eight CCEs are combined from among CCE 0 to CCE 17 are configured.

FIG. 21 illustrates a configuration example of search spaces according to the present embodiment. The search spaces shown in FIG. 21 are configured for a single terminal 200, and search spaces that are different from the search spaces shown in FIG. 21 are configured for terminals 200 other than the relevant terminal 200.

(Aggregation Level 1)

Search space configuration section 102 configures CCEs in which the numbers of REs are different as a plurality of (in this case, six) mapping candidates, respectively. More specifically, as six mapping candidates that are configured for one terminal 200, search space configuration section 102 selects CCEs from among CCE 0 to CCE 17 so as to include both CCEs in which the number of REs is 37 (CCE #(3N) and CCE #(3N+1)) and a CCE in which the number of REs is 34 (CCE #(3N+2)).

For example, with respect to one terminal 200, search space configuration section 102 selects two CCEs each from the three kinds of CCEs, namely, CCE #(3N), CCE #(3N+1), and CCE #(3N+2) and configures the respective CCEs as six mapping candidates that correspond to aggregation level 1. In FIG. 21, CCE 0 and CCE 9 (CCEs #(3N)), CCE 4 and CCE 13 (CCEs #(3N+1)), and CCE 8 and CCE 17 (CCEs #(3N+2)) are configured as single mapping candidates, respectively.

In this case, the six mapping candidates are formed by 37 REs, 37 REs, 34 REs, 37 REs, 37 REs, and 34 REs, respectively. That is, in the search space, CCEs in which the numbers of REs are different from each other are included in the CCEs that respectively constitute the plurality of (six) mapping candidates.

(Aggregation Level 2)

Search space configuration section 102 configures a search space so that the total numbers of REs included in the CCEs forming the mapping candidates (that is, the total numbers of REs of two CCEs) are equalized among the mapping candidates. In other words, search space configuration section 102 configures a search space so that, among a plurality of (six) mapping candidates forming the search space, a difference between the total numbers of REs included in the CCEs forming the mapping candidates (that is, the total numbers of REs of two CCEs) is minimized. More specifically, search space configuration section 102 selects two sets of a pair of CCE #(3N) and CCE #(3N+1), a pair of CCE #(3N+1) and CCE #(3N+2), and a pair of CCE #(3N+2) and CCE #(3N) from among CCE 0 to CCE 17, and configures the selected pairs as six mapping candidates.

In FIG. 21, a pair of CCE 6 and CCE 7 and a pair of CCE 15 and CCE 16 (pairs of CCE #(3N) and CCE #(3N+1)), a pair of CCE 1 and CCE 2 and a pair of CCE 10 and CCE 14 (pairs of CCE #(3N+1) and CCE #(3N+2)), and a pair of CCE 5 and CCE 3 and a pair of CCE 14 and CCE 12 (pairs of CCE #(3N+2) and CCE #(3N)) are each configured as a single mapping candidate.

The numbers of REs of the mapping candidates formed by the respective pairs of three kinds that are described above are 74 (37+37) REs, 71 (37+34) REs, and 71 (34+37) REs.

(Aggregation Level 4)

Similarly to the case of aggregation level 2, search space configuration section 102 configures a search space so that among a plurality of (two) mapping candidates forming the search space, a difference between the total numbers of REs included in the CCEs forming the mapping candidates (that is, the total numbers of REs of four CCEs) is minimized. More specifically, search space configuration section 102 selects four CCEs from among CCE 0 to CCE 17 so as to include at least one of CCE #(3N), CCE #(3N+1), and CCE #(3N+2), and configures the selected CCEs as a single mapping candidate.

For example, search space configuration section 102 configures any two mapping candidates from among: a mapping candidate (number of REs: 145) including two CCEs #(3N), one CCE #(3N+1), and one CCE #(3N+2); a mapping candidate (number of REs: 145) including one CCE #(3N), two CCEs #(3N+1), and one CCE #(3N+2); and a mapping candidate (number of REs: 142) including one CCE #(3N), one CCE #(3N+1), and two CCEs #(3N+2).

In FIG. 21, a combination of CCE 0, CCE 12, CCE 7 and CCE 2 (two CCEs #(3N), one CCE #(3N+1), one CCE #(3N+2)) and a combination of CCE 6, CCE 1, CCE 13 and CCE 8 (one CCE #(3N), two CCEs #(3N+1), one CCE #(3N+2)) are each configured as a single mapping candidate.

(Aggregation Level 8)

Similarly to the case of aggregation levels 2 and 4, search space configuration section 102 configures a search space so that among a plurality of (two) mapping candidates forming the search space, a difference between the total numbers of REs included in the CCEs forming the mapping candidates (that is, the totals of the numbers of REs of eight CCEs) is minimized. More specifically, search space configuration section 102 selects eight CCEs from among CCE 0 to CCE 17 so as to include at least one of CCE #(3N), CCE #(3N+1), and CCE #(3N+2), and configures the selected CCEs as a single mapping candidate.

For example, search space configuration section 102 configures any two mapping candidates from among: a mapping candidate (number of REs: 290) including three CCEs #(3N), three CCEs #(3N+1), and two CCEs #(3N+2); a mapping candidate (number of REs: 287) including three CCEs #(3N), two CCEs #(3N+1), and three CCEs #(3N+2); and a mapping candidate (number of REs: 287) including two CCEs #(3N), three CCEs #(3N+1), and three CCEs #(3N+2).

In FIG. 21, a combination of CCE 0, CCE 3, CCE 12, CCE 4, CCE 7, CCE 16, CCE 2 and CCE 11 (three CCEs #(3N), three CCEs #(3N+1), two CCEs #(3N+2)) and a combination of CCE 6, CCE 9, CCE 1, CCE 10, CCE 13, CCE 5, CCE 8 and CCE 17 (two CCEs #(3N), three CCEs #(3N+1), three CCEs #(3N+2)) are each configured as a single mapping candidate.

By performing the above described processing, search space configuration section 102 configures search spaces of terminal 200. Note that search space configuration section 102 performs the above described search space configuration for each terminal 200.

Thus, according to the present embodiment, similarly to Embodiments 1 and 2, the number of REs that can be used for an ePDCCH can be equalized among terminals 200 at the aggregation levels 1, 2, 4, and 8. That is, at the aggregation levels, differences in the numbers of REs that can be used for ePDCCHs are eliminated between terminals 200. Therefore, base station 100 can equitably configure the numbers of REs that can be used for ePDCCHs for each terminal 200, and inequalities in the numbers of REs (difference in the reception quality) that can be used for an ePDCCH between terminals 200 are moderated.

In addition, according to the present embodiment, similarly to Embodiments 1 and 2, at each of aggregation levels 2, 4, and 8, since differences in the number of REs between the mapping candidates are minimized, the numbers of REs that can be used for ePDCCHs can be equalized among the mapping candidates. That is, differences in the reception quality of terminals 200 that are attributable to the numbers of REs can be equalized among the mapping candidates. In other words, inequalities in the numbers of REs (difference in the reception quality) are moderated by the selection of the mapping candidates in which to locate the control information.

Furthermore, in FIG. 21, six mapping candidates are configured according to localized allocation in aggregation levels 1 and 2, and two mapping candidates are configured according to distributed allocation in aggregation levels 4 and 8. Note that, in localized allocation one mapping candidate is formed by CCEs within the same PRB pair, and in distributed allocation one mapping candidate is formed by CCEs of a plurality of PRB pairs.

In FIG. 21, similarly to Embodiment 2 (see FIG. 18), in aggregation levels 1 and 2 (portions surrounded by ovals formed by solid lines), mapping candidates are configured so that a UL grant and a DL assignment are assigned to the same PRB pair (for example, a PRB pair with favorable channel quality). That is, search space configuration section 102 selects mutually different CCEs in the same PRB pair, and configures the selected CCEs as a mapping candidate for aggregation levels 1 and 2. It is thereby possible for base station 100 to locate a UL grant and a DL assignment for which the aggregation levels are different from each other in mapping candidates in the same PRB pair. That is, base station 100 can transmit a UL grant and a DL assignment simultaneously using the same PRB pair.

Note that search space configuration section 205 of terminal 200 performs similar operations as search space configuration section 102.

According to the present embodiment that is described above, even in a case where one PRB pair is divided into three CCEs, similarly to Embodiments 1 and 2 (cases of dividing a PRB pair into four CCEs), resources that can be used for ePDCCHs can be equalized among terminals 200, and an inequality in the reception characteristics of control information can be reduced. Further, according to the present embodiment, similarly to Embodiments 1 and 2, when the aggregation level is 2 or more, resources that can be used for ePDCCHs can be equalized among a plurality of mapping candidates that are configured for one terminal 200, and an inequality in the reception characteristics of control information can be reduced.

Note that, in the present embodiment, with respect to aggregation level 2, mapping candidates are configured so as to include two sets of three kinds of pairs, namely, a pair of CCE #(3N) and CCE #(3N+1), a pair of CCE #(3N+1) and CCE #(3N+2), and a pair of CCE #(3N+2) and CCE #(3N). However, according to the present embodiment, in aggregation level 2, it is also possible to use only the pair of CCE #(3N+1) and CCE #(3N+2) and the pair of CCE #(3N+2) and CCE #(3N). In other words, a configuration may also be adopted in which, in aggregation level 2, only CCE pairs formed by a CCE with the largest number of REs (CCE #(3N) or CCE #(3N+1)) and a CCE with the smallest number of REs (CCE #(3N+2)) are used. By adopting this configuration, the number of REs of all the pairs is 71, and thus the number of REs is the same among the mapping candidates.

Further, in the present embodiment, as shown in FIG. 20B, when the size of only one CCE (CCE #(3N+2) in FIG. 20B) among three CCEs forming each PRB pair is different, a configuration may also be adopted in which only pairs that include the aforementioned CCE are configured as mapping candidates of aggregation level 2. By adopting this configuration, it is also possible to make the number of REs the same among the mapping candidates. In the case illustrated in FIG. 20B, such a configuration may be adopted by configuring only a pair of CCE #(3N+1) and CCE #(3N+2) and a pair of CCE #(3N+2) and CCE #(3N) as the mapping candidates of aggregation level 2.

The foregoing describes the embodiments of the present invention.

Other Embodiments

[1] The embodiments have been described with the cases in which it is assumed that the search spaces of aggregation levels 1, 2, 4, and 8 have (4, 4, 4, 2) or (6, 6, 2, 2) "mapping candidates" respectively. However, the aggregation level values and the number of mapping candidates at each aggregation level are not limited to these values.

[2] Although the embodiments have been described on the premise that PRB pairs are divided in the frequency axis direction (FDM: frequency division multiplexing), a direction in which PRB pairs are divided is not limited thereto. That is, PRB pairs may also be divided in a code axis direction (CDM: code division multiplexing) or a time axis direction (TDM: time division multiplexing).

[3] Although the embodiments have been described taking CCEs as division units of PRB pairs, units obtained by further dividing CCEs may also be taken as division units of PRB pairs. In this case, each of the embodiments described above can be applied to the aforementioned division units that constitute each CCE. For example, when generating CCEs, by generating one CCE by combining the aforementioned division units in which the numbers of REs are different, variations in the numbers of REs among CCEs that are generated can be suppressed.

[4] Although the embodiments have been described taking a case in which the present invention is formed by hardware as an example, it is also possible to realize the present invention by software in conjunction with hardware.

Each function block employed in the description of the above embodiments may typically be implemented as an LSI formed by an integrated circuit. These may be individual chips or partially or totally contained on a single chip. The term "LSI" is adopted here, but this may also be referred to as "IC," "system LSI," "super LSI," or "ultra LSI" depending on differing extents of integration.

Further, the method of circuit integration is not limited to an LSI, and implementation using dedicated circuitry or general purpose processors is also possible. After LSI manufacture, utilization of an FPGA (field programmable gate array), which can be programmed, or a reconfigurable processor that enables reconfiguration of connections or settings of circuit cells within an LSI is also possible.

Further, if integrated circuit technology emerges that replaces LSIs as a result of the advancement of semiconductor technology or a derivative other technology, naturally it is also possible to carry out function block integration using such technology. Application of biotechnology or the like is also possible.

A transmission apparatus according to this disclosure includes: a configuration section that configures a search space formed by a plurality of mapping candidates based on an aggregation level value, each of the plurality of mapping candidates being formed by the same number of control channel elements as the aggregation level value, the control channel elements being obtained by dividing each physical resource block into a predetermined number of parts; and a transmission section that transmits control information mapped to one of the plurality of mapping candidates in the configured search space, in which: the numbers of resource elements included in the predetermined number of control channel elements in each of the physical resource blocks take at least two kinds of values; and the configuration section configures the search space so that, in a search space for which the aggregation level value is at least two, among the plurality of mapping candidates, a difference between total numbers of elements included in control channel elements forming the mapping candidates is minimized.

In the transmission apparatus according to this disclosure, in a search space for which the aggregation level value is one, control channel elements having a different number of the resource elements from each other are included in control channel elements that form the plurality of mapping candidates.

In the transmission apparatus according to this disclosure, in a case where the aggregation level value is two and the predetermined number is four, at least one of the plurality of mapping candidates is formed by a pair of a control channel element having a largest number of the resource elements and a control channel element having a smallest number of the resource elements.

In the transmission apparatus according to this disclosure, in a case where the aggregation level value is two and the predetermined number is four, at least one of the plurality of mapping candidates is formed by control channel elements having a different number of the resource elements from the pair.

In the transmission apparatus according to this disclosure, in a case where the aggregation level value is four and the predetermined number is four, each of the mapping candidates includes one set of the control channel elements of four kinds obtained by dividing one physical resource block into four parts.

In the transmission apparatus according to this disclosure, at least one of the mapping candidates includes one set of the four kinds of control channel elements of an identical physical resource block.

In the transmission apparatus according to this disclosure, at least one of the mapping candidates includes one each of the four kinds of control channel elements of different physical resource blocks.

In the transmission apparatus according to this disclosure, in a case where the aggregation level value is eight and the predetermined number is four, each of the mapping candidates includes two sets of the control channel elements of four kinds obtained by dividing one physical resource block into four parts.

In the transmission apparatus according to this disclosure: the control information is first information relating to a downlink or second information relating to an uplink; the configuration section configures, for an identical aggregation level, a first search space for the first information and a second search space for the second information; and the first search space and the second search space are formed by the mapping candidates formed of the control channel elements different from each other.

In the transmission apparatus according to this disclosure, at an aggregation level of a value smaller than the predetermined number, the first search space and the second search space are formed by the mapping candidates formed of the control channel elements different from each other within the identical physical resource block.

In the transmission apparatus according to this disclosure, the first search space, and a third search space for the second information at an aggregation level adjacent to an aggregation level of the first search space are formed by the mapping candidates formed of the control channel elements different from each other within the identical physical resource block.

A reception apparatus according to this disclosure includes: a configuration section that configures a search space formed by a plurality of mapping candidates based on an aggregation level value, each of the plurality of mapping candidates being formed by the same number of control channel elements as the aggregation level value, the control channel elements being obtained by dividing each physical resource block into a predetermined number of parts; and a reception section that receives control information mapped to one of the plurality of mapping candidates forming the configured search space, in which: the numbers of resource elements included in the predetermined number of control channel elements in each of the physical resource blocks take at least two kinds of values; and the configuration section configures the search space so that, among the plurality of mapping candidates forming each search space for which the aggregation level value is at least two, a difference between total numbers of elements included in control channel elements forming the mapping candidates is minimized.

A transmission method according to this disclosure includes: configuring a search space formed by a plurality of mapping candidates based on an aggregation level value, each of the plurality of mapping candidates being formed by the same control channel elements as the aggregation level value, the control channel elements being obtained by dividing each physical resource block into a predetermined number of parts; transmitting control information mapped to one of the plurality of mapping candidates in the configured search space; causing the numbers of elements included in the predetermined number of control channel elements in each of the physical resource blocks to take at least two kinds of values; and configuring the search space so that, in each search space for which the aggregation level value is at least two, among the plurality of mapping candidates, a difference between total numbers of elements included in control channel elements forming the mapping candidates is minimized.

A reception method according to this disclosure includes: configuring a search space formed by a plurality of mapping candidates based on an aggregation level value, each of the plurality of mapping candidates being formed by the same number of control channel elements as the aggregation level value, the control channel elements being obtained by dividing each physical resource block into a predetermined number of parts; receiving control information mapped to one of the plurality of mapping candidates forming the configured search space; causing the numbers of elements included in the predetermined number of control channel elements in each of the physical resource blocks to take at least two kinds of values; and configuring the search space so that, in each search space for which the aggregation level value is at least two, among the plurality of mapping candidates, a difference between total numbers of elements included in control channel elements forming the mapping candidates is minimized.

The disclosure of the specification, drawings, and abstract included in Japanese Patent Application No. 2012-009267, filed on Jan. 19, 2012, is incorporated herein by reference in its entirety.

INDUSTRIAL APPLICABILITY

The present invention is useful in that, even in a case where there is an inequality with respect to the numbers of REs included in CCEs obtained by division within each PRB pair, the resources available for ePDCCHs can be equalized among terminals and an inequality in reception characteristics of control information can be reduced.

REFERENCE SIGNS LIST

100 Base station
200 Terminal
101 Assignment information generation section
102, 205 Search space configuration section
103, 207 Error correction coding section
104, 208 Modulation section
105, 209 Signal assignment section
106, 210 Transmission section
107, 201 Reception section
108, 203 Demodulation section
109, 204 Error correction decoding section
202 Signal separating section
206 Control signal reception section

The invention claimed is:

1. An integrated circuit comprising:
circuitry, which, in operation, controls
receiving a control signal transmitted on an Enhanced Physical Downlink Control Channel (EPDCCH) from a base station apparatus, the control signal being mapped to one of a plurality of search spaces in the EPDCCH wherein the plurality of search spaces are organized in units Resource Block (RB) pairs, each RB pair including Control Channel Elements (CCEs) aggregated at a CCE aggregation level;
identifying the one of the plurality of search spaces to which the control signal is mapped, wherein when the CCE aggregation level is one, the plurality of search spaces include a first CCE, which belongs to a first RB pair and includes a first number of resource elements (REs), and a second CCE, which belongs to a second RB pair different from the first RB pair and includes a second number of REs different from the first number of REs; and
decoding the identified search space and acquiring the control signal that is mapped to the identified search space.

2. The integrated circuit according to claim 1, wherein the plurality of search spaces are configured for a communication apparatus.

3. The integrated circuit according to claim 1, wherein the control signal indicates downlink assignment and uplink grant.

4. The integrated circuit according to claim 1, wherein the first CCE and the second CCE are allocated on the EPDCCH by either of a localized allocation or a distributed allocation.

5. The integrated circuit according to claim 1, wherein each RB pair includes four CCEs.

6. The integrated circuit according to claim 1, wherein each of the plurality of search spaces includes a plurality of mapping candidates that are sized according to the CCE aggregation level and, when the CCE aggregation level is one, each of the plurality of search spaces includes a first mapping candidate formed of the first CCE and a second mapping candidate formed of the second CCE.

7. The integrated circuit according to claim 1, wherein each of the plurality of search spaces includes a plurality of mapping candidates that are sized according to the CCE aggregation level and, when the CCE aggregation level is two, each of the plurality of search spaces includes at least one mapping candidate, which is formed of the first CCE and the second CCE.

* * * * *